United States Patent [19]

Kawashima

[11] Patent Number: 5,124,543

[45] Date of Patent: Jun. 23, 1992

[54] LIGHT EMITTING ELEMENT, IMAGE SENSOR AND LIGHT RECEIVING ELEMENT WITH LINEARLY VARYING WAVEGUIDE INDEX

[75] Inventor: Ikue Kawashima, Sendai, Japan

[73] Assignees: Ricoh Company, Ltd., Tokyo; Ricoh Research Institute of General Electronics Co., Ltd., Natori, both of Japan

[21] Appl. No.: 564,078

[22] Filed: Aug. 8, 1990

[30] Foreign Application Priority Data

| Aug. 9, 1989 | [JP] | Japan | 1-206353 |
| Oct. 4, 1989 | [JP] | Japan | 1-259532 |
| Oct. 13, 1989 | [JP] | Japan | 1-267264 |
| Jul. 10, 1990 | [JP] | Japan | 2-182266 |

[51] Int. Cl.⁵ .......................................... H01J 40/14
[52] U.S. Cl. ............................ 250/208.1; 250/227.20
[58] Field of Search .......... 250/208.1, 227.20, 227.11; 350/96.14

[56] References Cited

U.S. PATENT DOCUMENTS

| 4,120,560 | 10/1978 | Baues et al. | 350/96.14 |
| 4,196,964 | 4/1980 | Papuchon | 350/96.14 |
| 4,759,595 | 7/1988 | Boord et al. | 350/96.14 |

FOREIGN PATENT DOCUMENTS

| 57-7087 | 1/1982 | Japan . |
| 58-106947 | 6/1983 | Japan . |
| 58-106947 | 6/1983 | Japan . |
| 61100073 | 10/1984 | Japan . |
| 60-264096 | 12/1985 | Japan . |
| 61-100073 | 5/1986 | Japan . |
| 189280 | 9/1987 | Japan . |
| 1109694 | 10/1987 | Japan . |
| 63-299269 | 12/1988 | Japan . |
| 1-109694 | 4/1989 | Japan . |
| 6489280 | 4/1989 | Japan . |

OTHER PUBLICATIONS

SID 86 Digest, pp. 270-272, Z.K. Kun, et al., "TFEL Edge Emitter Array for Optical Image Bar Applications".

*Primary Examiner*—David C. Nelms
*Assistant Examiner*—T. Davenport
*Attorney, Agent, or Firm*—Oblon, Spivak, McClelland, Maier & Neustadt

[57] ABSTRACT

An optical device includes a substrate, an optical waveguide provided on a surface of the substrate, and an electroluminescence element including a first electrode layer, a first insulator layer, a light emitting layer for emitting light, a second insulator layer and a second electrode layer which are successively stacked. The light emitted from the light emitting layer is emitted from an end surface of the optical waveguide. The optical waveguide has a refractive index which increases from an outer periphery to a center portion of a cross section which is approximately parallel to the end surface, and the electroluminescence element is provided within the optical waveguide.

53 Claims, 16 Drawing Sheets

FIG.1 PRIOR ART
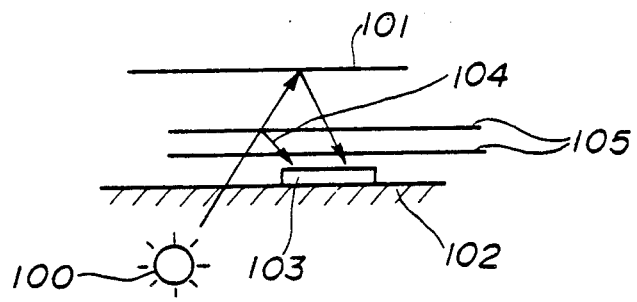
FIG.2A PRIOR ART
FIG.2B PRIOR ART
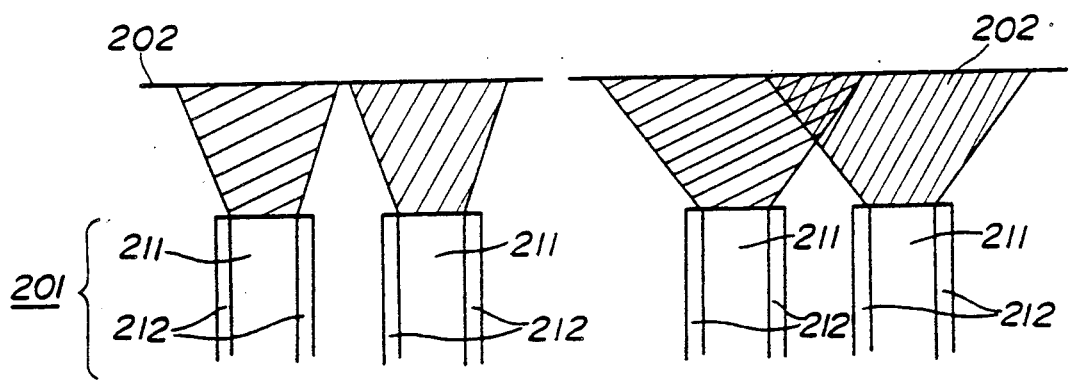

FIG. 9

| SAMPLE | THICKNESS OF CORE LAYER (μm) | THICKNESS OF CLADDING LAYER (μm) | ($n_{core}/n_{EL}$) | ($n_{cl}/n_{EL}$) | QUANTITY OF EMITTED LIGHT (μW) | EVALUATION |
|---|---|---|---|---|---|---|
| [1] | 2 | 3 | 2.0/0.83 | 1.45/0.60 | 45 | "B" |
| [2] | 20 | 3 | 2.0/0.83 | 1.45/0.60 | 120 | "A" |
| [3] | 20 | 1 | 2.0/0.83 | 1.45/0.60 | 60 | "B" |
| [4] | 20 | 3 | 1.7/0.71 | 1.45/0.60 | 85 | "B" |
| [5] | 20 | 3 | 1.5/0.63 | 1.45/0.60 | 72 | "B" |
| [6] | 20 | 3 | 2.0/0.83 | 1.8 0.75 | 80 | "B" |
| [7] | — | — | — | — | 5 | "C" |
| [8] | 20 | — | 2.0/0.83 | — | 25 | "C" |

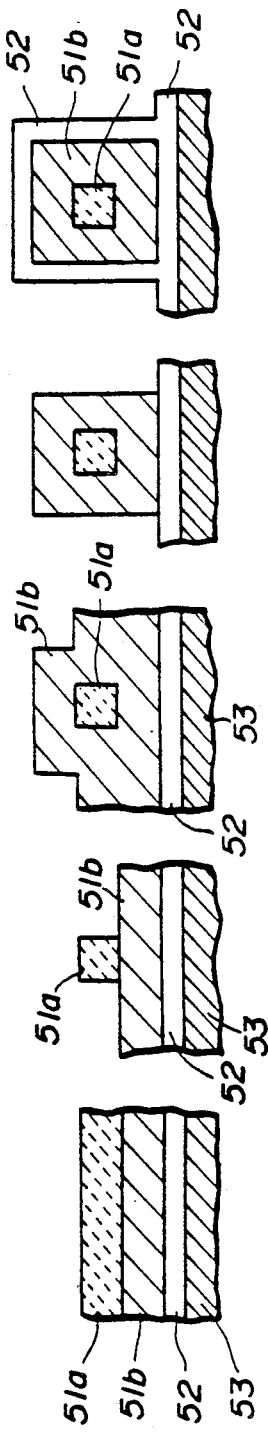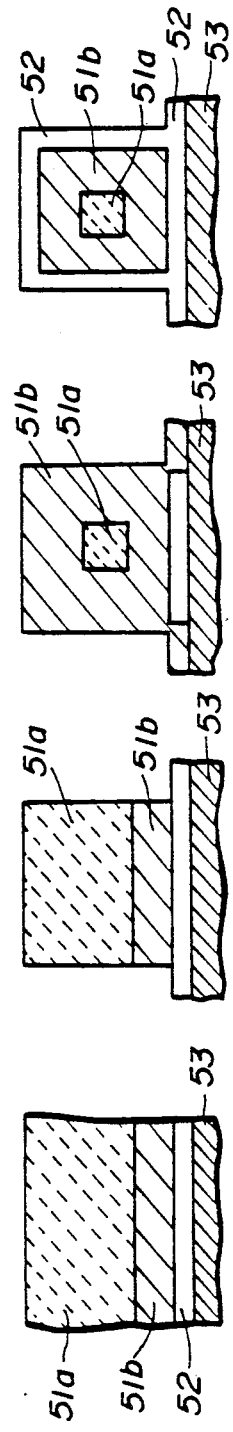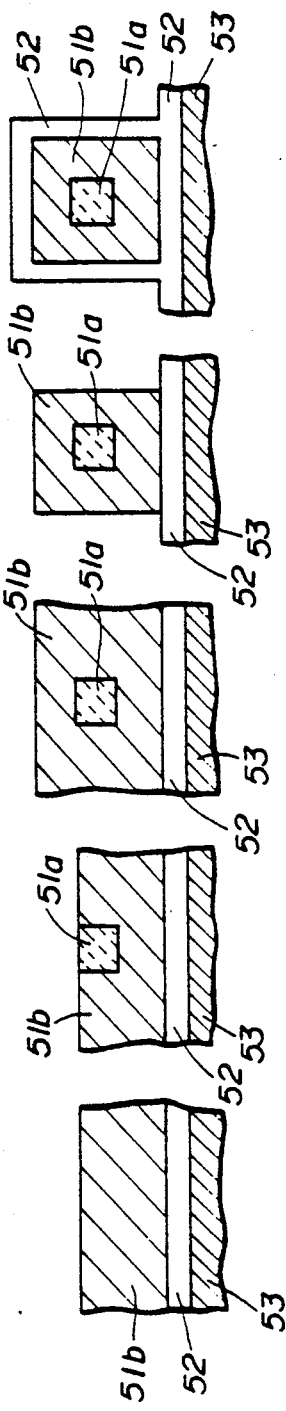

FIG.35

| SAMPLE | $n_1$ | $n_2$ | $n_1/n_2$ | R | Iw(nA) | EVALUATION |
|---|---|---|---|---|---|---|
| [11] | 1.475 | 1.47 | 1.003 | 0.88 | 0.50 | "A" |
| [12] | 1.50 | 1.47 | 1.02 | 0.89 | 0.65 | "A" |
| [13] | 1.76 | 1.47 | 1.19 | 0.85 | 1.20 | "A" |
| [14] | 1.8 | 1.47 | 1.22 | 0.83 | 1.22 | "A" |
| [15] | 2.0 | 1.47 | 1.43 | 0.81 | 1.20 | "B" |
| [16] | 2.2 | 1.47 | 1.50 | 0.75 | 1.16 | "C" |
| [17] | - | 1.47 | - | 0.88 | 0.36 | "C" |

FIG. 36

| SAMPLE | TAPER ANGLE α | R | Iw (nA) | EVALUATION |
|---|---|---|---|---|
| [21] | 5° | 0.85 | 1.22 | "A" |
| [22] | 20° | 0.90 | 1.25 | "A" |
| [23] | 60° | 0.86 | 1.21 | "A" |
| [24] | 65° | 0.83 | 1.08 | "B" |
| [25] | 75° | 0.81 | 0.52 | "B" |
| [26] | 85° | 0.81 | 0.43 | "C" |
| [27] | — | 0.78 | 1.20 | "C" |

FIG. 37

| SAMPLE | CORE AREA (μm²) | f(μm) | a(μm) | na/b | R | Iw(nA) | EVALUATION |
|---|---|---|---|---|---|---|---|
| [31] | 5 | 5 | 4 | 0.2 | 0.85 | 0.15 | "C" |
| [32] | 10 | 7 | 6 | 0.3 | 0.85 | 0.56 | "A" |
| [33] | 15 | 10 | 10 | 0.5 | 0.85 | 0.83 | "A" |
| [34] | 20 | 12 | 13 | 0.67 | 0.93 | 1.45 | "A" |
| [35] | 20 | 18 | 30 | 1.5 | 0.94 | 0.78 | "A" |
| [36] | 20 | 20 | 40 | 2.0 | 0.95 | 0.51 | "A" |
| [37] | 20 | 21.5 | 50 | 2.5 | 0.95 | 0.33 | "C" |
| [38] | 20 | - | - | - | 0.78 | 1.20 | "C" |

LIGHT EMITTING ELEMENT, IMAGE SENSOR AND LIGHT RECEIVING ELEMENT WITH LINEARLY VARYING WAVEGUIDE INDEX

BACKGROUND OF THE INVENTION

The present invention generally relates to light emitting elements, image sensors, and light receiving elements. More particularly, the present invention relates to a light emitting element, an image sensor, and a light receiving element which are suited for use in an image scanner of a facsimile machine, a copying machine and the like.

In facsimile machines, there is an increasing demand to clearly transmit fine drawings, photographs and the like. A primary factor which determines the picture quality is the resolution of the image scanner. By use of an image scanner having a high resolution, it becomes possible to transmit fine drawings, photographs and the like with a high picture quality.

Normally, in the case of the facsimile machine, a document is read by a sensor array which includes one-dimensionally arranged photoelectric conversion elements. The resolution of the sensor array increases as each sensor element confronts a smaller region of the document surface. However, as the sensor element confronts a smaller region of the document surface, a light receiving area of the sensor element consequently becomes smaller. As a result, a quantity of light received by the sensor element decreases and the signal-to-noise (S/N) ratio becomes poor.

In order to eliminate the above described problems, it is possible to consider reducing the electrical noise, improving the light sensitivity of the sensor itself and the like. However, it is most effective to improve the luminance of the light which illuminates the document surface by a light source.

A xenon lamp, a light emitting element (LED) array or the like is used as the light source for the sensor of the facsimile machine. However, these light sources have poor light converging characteristics. For example, in the case of an image scanner having a resolution of 16 lines/mm or 32 lines/mm, the region of the document surface which must be illuminated by the light from the light source is in a range of 30 to 50 $\mu$m with respect to a scanning direction of the image scanner. However, the xenon lamp usually has a tube diameter of at least 1 mm, and it is difficult to converge the light to a width of 0.5 mm or less even by the use of a lens system. On the other hand, when the light from the LED array is excessively converged, there is a problem in that the light intensity become irregular because the LEDs are arranged discretely in the LED array.

When an electroluminescence (EL) element proposed in a Japanese Laid-Open Patent Application No.57-7087 is used as the light source, the width of the emitted light is determined by the thickness of a transparent substrate. But when the width of the emitted light is to be set to 30 $\mu$m, for example, the transparent substrate must have an extremely small thickness of 30 $\mu$m. When making an elongated light source, the substrate may warp due to a stress generated between the substrate and the EL element, and it is difficult to hold the substrate during a photolithograhy process and the like because the substrate is extremely thin. In addition, a metal reflection layer is used to trap the light. Unlike a total reflection, the reflectivity of the metal reflection layer is not 100%. But when the reflection is repeated a large number of times, the light quantity decreases and there is a problem in that the luminance of the light becomes small at an emitting edge for the light which is generated at a distant location from the emitting edge.

On the other hand, another EL element is proposed in Kun et al., "TFEL Edge Emitter Array for Optical Image Bar Applications", SID 86 DIGEST, pp.270-272. However, this EL element has an emitter layer which has a thickness in the order of 1 $\mu$m and is too thin for use as the light source for the sensor. If the thickness of the light emitting layer were increased to 10 $\mu$m, for example, a driving voltage of the EL element must be increased to a range of several kV to several tens of kV, and the reliability of the EL element becomes poor.

A Japanese Laid-Open Patent Application No.64-89280 proposes an EL element which is combined with a waveguide. According to this EL element, the light emitting layer is provided above or below the EL element. However, the emitted light cannot reach the substrate edge while satisfying the conditions for total reflection because the light emitting element is not provided within the waveguide, and the light intensity inevitably decreases.

On the other hand, a light emitting element having a cladding layer provided on both sides of the light emitting layer is proposed in a Japanese Laid-Open Patent Application No.1-109694. According to this structure, it is possible to prevent the light from leaking outside the light emitting layer. However, the luminance of the light emitted from the edge inevitably decreases due to the reabsorption of light within the light emitting layer.

As described above, it is essential that the sensor which reads the document has a high resolution in order to obtain a high picture quality. The resolution of the sensor may be affected by stray light existing between a light illuminating system and a light receiving system of the sensor.

The light which illuminates the document surface is originally reflected depending on the tone of the document and the reflected light reaches the light receiving element. However, a portion of the light emitted from the light source is reflected at an interface of a thin film which is interposed between the document and the light receiving element, and this portion of the light reaches the light receiving element directly. This portion of the light is referred to as the stray light.

FIG. 1 is a cross sectional view for explaining the stray light generated in the conventional sensor. FIG. 1 shows a light source 100, a document 101, a substrate 102, a photoelectric conversion element 103, stray light 104, and interfaces 105 of thin films.

When the stray light exists, the photocurrent of the light receiving element is no longer solely dependent on the tone of the document, and the resolution of the sensor deteriorates.

For example, Japanese Laid-Open Patent Applications No.61-100073 and No.58-106947 propose arrangements for preventing deterioration of the resolution due to the stray light, by providing an optical waveguide in the light illuminating system and the light receiving system. However, according to these proposals, there are problems in that the light source and the waveguide must be assembled, the production process is complex because of the need to form the light receiving element on the edge of the waveguide so as to cover the edge and the like. For these reasons, it is difficult to reduce both the size and production cost of the sensor.

Next, a description will be given of an edge receiving type image sensor (image reading element) which uses an optical waveguide in the light receiving system. Compared to the image sensors of the conventional facsimile machines using a reduction optical system or a full-size imaging system, the image sensor which uses the optical waveguide is advantageous in that a light illuminating system for illuminating the document and the light receiving system for receiving the light at the photoelectric conversion part can be isolated optically. For this reason, the image sensor which uses the optical waveguide is developed for applications where a high resolution is required, such as the case where fine graphics, drawings, photographs and the like are to be read.

In the edge receiving type image sensor, the light received from the edge of the optical waveguide reaches the photoelectric conversion part, and an incident angle of the light at the edge of the optical waveguide is uniquely determined depending on a ratio of refractive indexes of a core layer and a cladding layer. In other words, when the ratio of the refractive indexes of the core layer and the cladding layer of the optical waveguide is small, the incident angle of the light which is trapped within the optical waveguide and is transmitted to the photoelectric conversion part is small. On the other hand, when the ratio of the refractive indexes of the core layer and the cladding layer of the optical waveguide is large, the incident angle of the light which is transmitted to the photoelectric conversion part is large. Accordingly, in the edge receiving type image sensor, it cannot be determined unconditionally whether the ratio of the refractive indexes of the core layer and the cladding layer should be large or small. A more detailed description will now be given in conjunction with FIGS. 2A and 2B.

FIG. 2A shows an example of a case where a ratio of a refractive index $n_{core}$ of a core layer 211 and a refractive index $n_{clad}$ of a cladding layer 212 is small. In this case, the incident angle of the light is small as indicated by hatchings, and regions of a document 202 which are read by two mutually adjacent optical waveguide edges of an image sensor 201 do not overlap between the document 202 and the image sensor 201, that is, the edges of the optical waveguides to be more accurate. As a result, the resolution of the image sensor 201 is high, and a change in the resolution of the image sensor 201 with respect to a change in the distance between the document 202 and the sensor 201 is small. But on the other hand, the absolute quantity of the light input to the optical waveguide edges from the document 202 is small because of the small incident angle of the light. For this reason, a large photocurrent cannot be obtained, and the S/N ratio of the image sensor 1 is deteriorated thereby.

On the other hand, FIG. 2B shows an example of a case where the ratio of the refractive index $n_{core}$ of the core layer 211 and the refractive index $n_{clad}$ of the cladding layer 212 is large. In this case, the incident angle of the light is large as indicated by hatchings, and the absolute quantity of the light input to the optical waveguide edges from the document 202 is large. However, the regions of the document 202 which are read by two mutually adjacent optical waveguide edges of the image sensor 201 overlap between the document 202 and the image sensor 201. As a result, the resolution of the image sensor 201 is poor, and a change in the resolution of the image sensor 201 with respect to a change in the distance between the document 202 and the sensor 201 is large.

Therefore, according to the conventional image sensor, it is impossible to simultaneously obtain satisfactory resolution and operation stability and satisfactory light quantity which is input to the optical waveguide edges, where the operation stability refers to the stability with respect to the change in the distance between the document and the image sensor.

SUMMARY OF THE INVENTION

Accordingly, it is a general object of the present invention to provide a novel and useful light emitting element, an image sensor, and a light receiving element in which the problems described above are eliminated.

Another and more specific object of the present invention is to provide an optical device comprising a substrate, a first optical waveguide provided on a surface of the substrate, and an electroluminescence element including a first electrode layer, a first insulator layer, a light emitting layer for emitting light, a second insulator layer and a second electrode layer which are successively stacked, where the light emitted from the light emitting layer is emitted from a first end surface of the first optical waveguide. The first optical waveguide has a refractive index which increases from an outer periphery to a center portion of a cross section which is approximately parallel to the first end surface, and the electroluminescence element is provided within the first optical waveguide. According to the optical device of the present invention, the attenuation of the light emitted from the light emitting layer is extremely small.

Still another object of the present invention is to provide an optical device of the type described above which further comprises a light blocking layer provided on the first optical waveguide, a second optical waveguide provided on the light blocking layer and a light receiving element for receiving the light which is emitted from the electroluminescence element via an object which is to be sensed and the second optical waveguide. The second optical waveguide has a second end surface from which the light is received from the object and a refractive index which increases from an outer periphery to a center portion of a cross section which is approximately parallel to the second end surface of the second optical waveguide. The second end surface of the second optical waveguide is adjacent to the first end surface of the first optical waveguide, and the light receiving element is provided within the second optical waveguide. According to the optical device of the present invention, it is possible to reduce both the size and production cost of the optical device. In addition, the utilization efficiency of the light emitted from the electroluminescence element is high because the first and second end surfaces of the first and second optical waveguides are adjacent to each other. Furthermore, it is possible to obtain a high resolution because the undesirable effects of stray light is suppressed by the inventive structure.

A further object of the present invention is to provide an optical device comprising an optical waveguide having an end surface for receiving light, and a light receiving element coupled to the optical waveguide for receiving the light from the end surface of the optical waveguide via the optical waveguide, where the optical waveguide has a refractive index which increases from an outer periphery to a center portion of a cross section which is approximately parallel to the end surface of the optical waveguide. According to the optical device of the present invention, the resolution and photocurrent can be improved.

Other objects and further features of the present invention will be apparent from the following detailed description when read in conjunction with the accompanying drawings.

BRIEF DESCRIPTION OF THE DRAWINGS

FIG. 1 is a cross sectional view for explaining stray light in a conventional sensor;

FIG. 2A shows an example of a conventional case where a ratio of a refractive index of a core layer and a refractive index of a cladding layer is small;

FIG. 2B shows an example of a conventional case where the ratio of the refractive index of the core layer and the refractive index of the cladding layer is large;

FIG. 9 is a diagram for explaining quantity of light emitted from various samples;

FIGS. 21A through 21E are cross sectional views for explaining an embodiment of forming a core layer having a desired refractive index distribution;

FIGS. 22A through 22D are cross sectional views for explaining another embodiment of forming the core layer having the desired refractive index distribution;

FIGS. 23A through 23E are cross sectional views for explaining still another embodiment of forming the core layer having the desired refractive index distribution;

FIG. 35 is a diagram for explaining the resolution and photocurrent obtainable in the first embodiment of the light receiving element;

FIG. 36 is a diagram for explaining the resolution and photocurrent obtainable in the third embodiment of the light receiving element; and FIG. 37 is a diagram for explaining the resolution and photocurrent obtainable in the seventh embodiment of the light receiving element.

DESCRIPTION OF THE PREFERRED EMBODIMENTS

First, a description will be given of a first embodiment of a light emitting element according to the present invention, by referring to FIG. 3.

Figure 3:
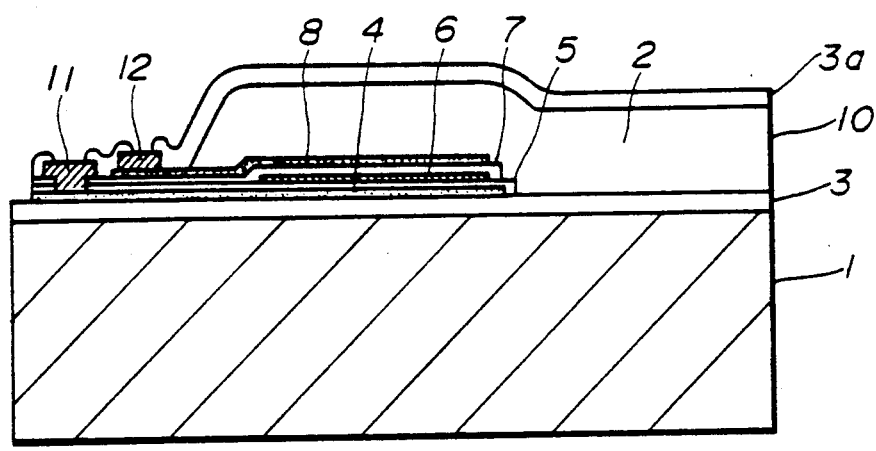
FIG. 3 is a cross sectional view showing an essential part of a first embodiment of a light emitting element according to the present invention.

A light emitting element shown in FIG. 3 includes a first cladding layer 3, a lower electrode 4, a lower insulator layer 5, a light emitting layer 6, an upper insulator layer 7 and an upper electrode 8 which are successively formed on a substrate 1. A core layer 2 is formed on the first cladding layer 3 and the upper electrode 8 as shown, and a second cladding layer 3a is formed on the core layer 2.

A light emitted from the light emitting layer 6 reaches interfaces of the core layer 2 and the cladding layers 3 and 3a via the core layer 2. When a refractive index of the core layer 2 is set greater than those of the cladding layers 3 and 3a, the light which satisfies the conditions for total reflection is reflected at the interface and transmitted back to the core layer 2. The light thereafter repeats the total reflection at the interfaces, and the light is emitted from an edge (end surface) 10 of the core layer 2. A similar phenomenon also occurs when a refractive index distribution type optical waveguide is used as the optical waveguide.

Figure 4:
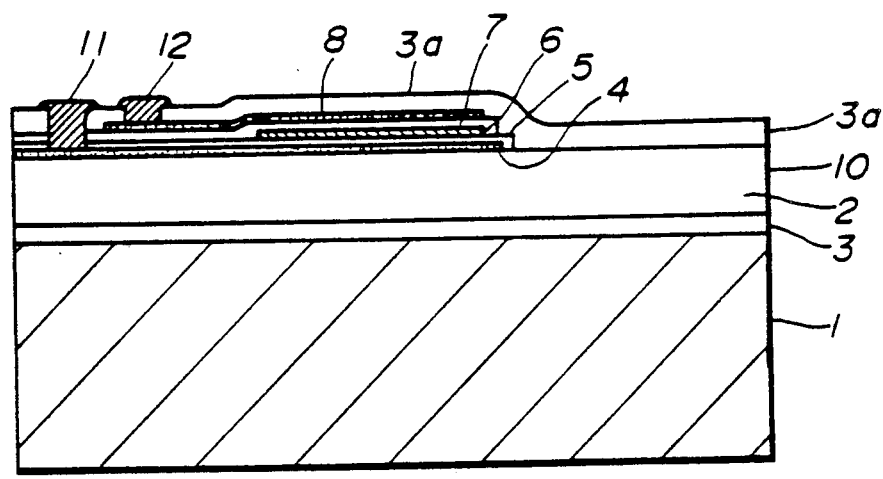
FIG. 4 is a cross sectional view showing an essential part of a second embodiment of the light emitting element according to the present invention.

FIG. 4 shows a second embodiment of the light emitting element according to the present invention. In FIG. 4, those parts which are essentially the same as those corresponding parts in FIG. 3 are designated by the same reference numerals, and a description thereof will be omitted.

A light emitting element shown in FIG. 4 includes the first cladding layer 3 and the core layer 2 which are successively formed on the substrate 1. The lower electrode 4, the lower insulator layer 5, the light emitting layer 6, the upper insulator layer 7, the upper electrode 8 and the second cladding layer 3a are successively formed on the core layer 2. Compared to the first embodiment, a distortion is unlikely to occur between the core layer 2 and the light emitting layer 6 in this second embodiment.

Figure 5:
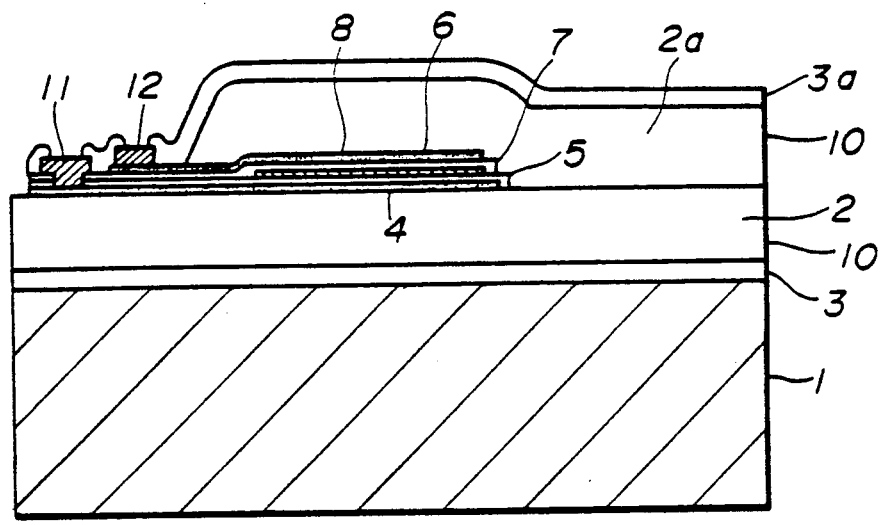
FIG. 5 is a cross sectional view showing an essential part of a third embodiment of the light emitting element according to the present invention.

FIG. 5 shows a third embodiment of the light emitting element according to the present invention. In FIG. 5, those parts which are essentially the same as those corresponding parts in FIGS. 3 and 4 are designated by the same reference numerals, and a description thereof will be omitted.

A light emitting element shown in FIG. 5 includes first and second core layers 2 and 2a. An EL element part includes the lower electrode 4, the lower insulator layer 5, the light emitting layer 6, the upper insulator layer 7 and the upper electrode 8. This EL element part is formed after the formation of the first core layer 2, and the second core layer 2a and the second cladding layer 3a are successively formed thereafter. Since the relatively thick core layers 2 and 2a cover the top and bottom of the light emitting layer 6, the light emitting layer 6 is less affected by contamination from the substrate 1 and air.

In the second and third embodiments shown in FIGS. 4 and 5, the light which is emitted from the light emitting layer 6 and satisfies the conditions for total reflection repeats the total reflection within the core layer 2 or the core layers 2 and 2a which are sandwiched between the cladding layers 3 and 3a, similarly to the first embodiment shown in FIG. 3. The light which repeats the total reflection is transmitted to the edge 10 and emitted therefrom.

A proportion P of the light which is transmitted to the edge of the core layer with respect to the light which is emitted from the light emitting layer is primarily determined by a ratio of the refractive indexes of the light emitting layer and the cladding layer. This proportion P can be approximated by the following formula (1), where $n_{EL}$ denotes the refractive index of the light emitting layer and $n_{cl}$ denotes the refractive index of the cladding layer.

$$P = 1 - (n_{cl}/n_{EL}) \quad (1)$$

It may be seen from the formula (1) that the proportion P of the light emitted from the edge of the core layer increases as the ratio of the refractive indexes of the light emitting layer and the cladding layer increases.

Figure 6:
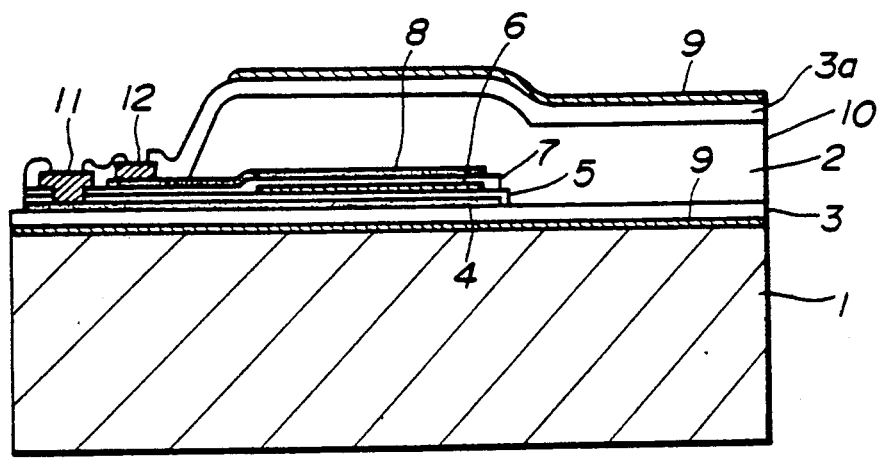
FIG. 6 is a cross sectional view showing an essential part of a fourth embodiment of the light emitting element according to the present invention.

Next, a description will be given of a fourth embodiment of the light emitting element according to the present invention, by referring to FIG. 6. In FIG. 6, those parts which are the same as those corresponding parts in FIGS. 3 through 5 are designated by the same reference numerals, and a description thereof will be omitted.

In the first through third embodiments, the light which does not satisfy the conditions for total reflection determined by the ratio of the refractive indexes of the light emitting layer 6 and the cladding layers 3 and 3a escapes towards the substrate 1 or to the surface free space. The fourth embodiment is designated to direct at least some of such light which does not satisfy the conditions for total reflection to the edge 10.

In FIG. 6, a thin reflection layer 9 which has a large reflectivity with respect to the wavelength of the emitted light is formed between the substrate 1 and the first cladding layer 3 and/or formed on top of the second cladding layer 3a. Instead of forming the reflection layer 9 between the substrate 1 and the first cladding layer 3, it is possible to make the substrate 1 from a material which has a large reflectivity with respect to the wavelength of the emitted light.

Figure 7:
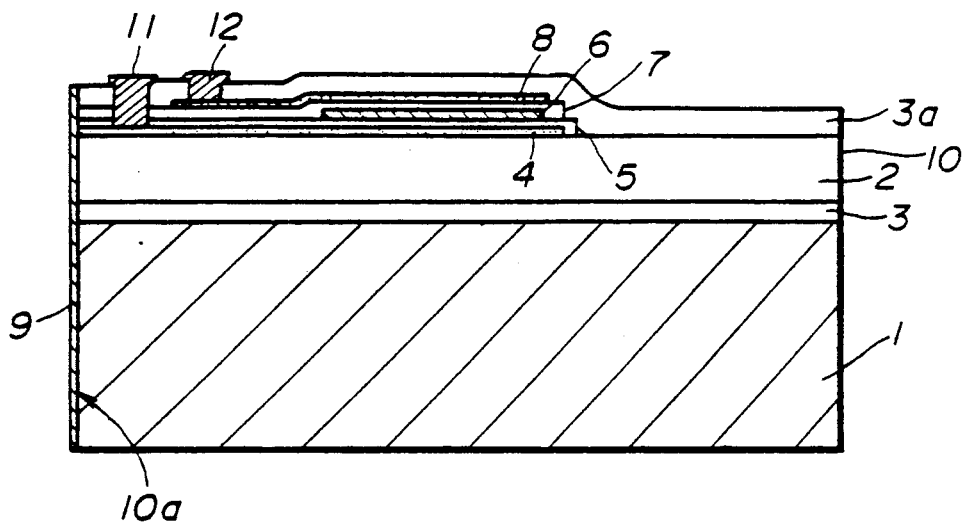
FIG. 7 is a cross sectional view showing an essential part of a fifth embodiment of the light emitting element according to the present invention.

FIG. 7 shows a fifth embodiment of the light emitting element according to the present invention. In FIG. 7, those parts which are the same as those corresponding parts in FIGS. 3 through 6 are designated by the same reference numerals, and a description thereof will be omitted.

A light emitting element shown in FIG. 7 has the reflection layer 9 formed on an edge 10a which is located on the opposite side from the edge 10. In this embodiment, the light which would otherwise escape from the edge 10a is reflected so that more light is directed to the edge 10.

Figure 8:
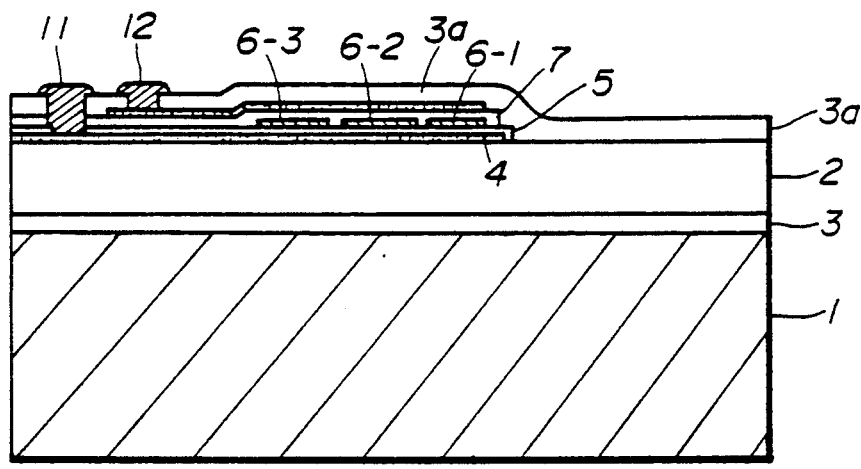
FIG. 8 is a cross sectional view showing a essential part of a sixth embodiment of the light emitting element according to the present invention.

Next, a description will be given of a sixth embodiment of the light emitting element according to the present invention, by referring to FIG. 8. In FIG. 8, those parts which are the same as those corresponding parts in FIGS. 3 and 4 are designated by the same reference numerals, and a description thereof will be omitted.

Conventionally, the EL element usually emits light only within a narrow wavelength region. For this reason, in order to obtain white light from the EL element, the light emitting layer has a multi-layer structure, that is, a stacked structure, as proposed in a Japanese Laid-Open Patent Application No.60-264096. However, when the stacked structure is employed, the electrode must take the form of a multi-level interconnection in order to drive the EL element, and in addition, the quality of the light emitting layer deteriorates when the multi-layer structure is employed. Therefore, difficulties are encountered when producing this kind of EL element.

But in this sixth embodiment, the light emitting layers 6-1, 6-2 and 6-3 respectively for the red, blue and green colors are arranged sequentially on the lower insulator layer 5 without being stacked on top of each other. As a result, it is possible to satisfactorily obtain the white light from the edge 10. The light emitting layers 6-1, 6-2 and 6-3 may be arranged in an arbitrary sequence. For example, the light emitting layer 6-1 for emitting red light is made of $SmCl_3$ doped ZnS, the light emitting layer 6-2 for emitting blue light is made of $TmF_3$ doped ZnS, and the light emitting layer 6-3 for emitting green light is made of $TbF_3$ doped ZnS. The luminance of the three primary colors of red, blue and green is adjusted by controlling the dosage of the dopant, controlling the thickness of the light emitting layer, controlling the light emitting area of the light emitting layer and the like. The sixth embodiment is suited for use as a high-luminance white light source for a color image sensor.

Next, a description will be given of a method of producing the second embodiment shown in FIG. 4. It is readily apparent to those skilled in the art that the first and third through sixth embodiments may be produced by similar processes, and a description thereof will be omitted.

In FIG. 4, an alumina substrate is used as the substrate 1. Prior to forming layers on the substrate 1, the surface of the substrate 1 is polished so that Ra > 100 Å. Then, a $SiO_2$ layer is formed by a chemical vapor deposition (CVD) as the first cladding layer 3. The substrate temperature is set to 250° C., and $SiH_4$, $N_2O$ and $N_2$ gases are used as source gases. Two kinds of samples [3], and [1] or [2] were made, on kind of sample [3] $SiO_2$ layer having a thickness of 1 μm and another kind of sample [1] or [2] $SiO_2$ layer having a thickness of 3 μm. The $SiO_2$ layer is formed at an RF power of 1 W/cm$^2$ and a gas pressure of 1 Torr, and flow rates of $SiH_4$, $N_2O$ and $N_2$ gases are respectively set to 5 SCCM, 40 SCCM and 20 SCCM.

Next, a $Si_3N_4$ layer is formed by a plasma CVD as the core layer 2. The substrate temperature is set to 300° C., and $SiH_4$, $N_2O$ and $N_2$ gases are used as source gases. Two kinds of samples [3], and [1] or [2] were made, one kind of sample [1] $Si_3N_4$ layer having a thickness of 2 μm and another kind of sample [2] or [3] $Si_3N_4$ layer having a thickness of 20 μm. The $Si_3N_4$ layer is formed at an RF power of 1 W/cm$^2$ and a gas pressure of 1 Torr, and flow rates of $SiH_4$, $N_2O$ and $N_2$ gases are respectively set to 5 SCCM, 40 SCCM and 10 SCCM.

Then, an ITO transparent conductor layer is formed by an RF sputtering as the lower electrode 4. The substrate temperature is set to 150° C, and a gas mixture of Ar and $O_2$ gasses is used as a sputtering gas. The ITO transparent conductor layer is formed at an RF power of 2 W/cm$^2$ and a gas pressure of 5 mTorr, and flow rates of Ar and $O_2$ gasses are respectively set to 30 SCCM and 20 SCCM so that the ITO transparent conductor layer is formed to a thickness of 1000 Å.

A $Ta_2O_3$ layer is formed by a sputtering as the lower insulator layer 5 using a $Ta_2O_3$ sintered material as a target. The sputtering is carried out under conditions identical to those used when forming the ITO transparent conductor layer. The $Ta_2O_3$ is formed to a thickness of 3000 Å.

A TbOF doped ZnS layer is formed as the light emitting layer 6 using a sintered material of ZnS powder and TbOF powder mixture as a target. The substrate temperature is set to 350° C., and a gas mixture of Ar and He gasses is used as a sputtering gas. The TbOF doped ZnS layer is formed at an RF power of 0.5 W/cm$^2$ and a sputtering gas pressure of $2 \times 10^{-2}$ Torr, and flow rates of Ar and He gasses are respectively set to 30 SCCM and 20 SCCM so that the TbOF doped ZnS layer is formed to a thickness of 7000 Å.

Next, the upper insulator layer 7 and the upper electrode 8 are respectively formed under the same conditions used for forming the lower insulator layer 5 and the lower electrode 4. The thicknesses of the upper insulator layer 7 and the upper electrode 8 are respectively the same as those of the lower insulator layer 5 and the lower electrode 4.

The second cladding layer 3a is formed under the same conditions used for forming the first cladding layer 3. The thickness of the second cladding layer 3a is the same as the thickness of the first cladding layer 3.

Finally, an Al layer is formed to a thickness of 1 μm by a vacuum vapor deposition for use as an interconnection for providing a lead to the electrodes 4 and 7.

A refractive index $n_{EL}$ of the light emitting layer 6, a refractive index $n_{core}$ of the core layer 2 and a refractive index $n_{cl}$ of the cladding layers 3 and 3a respectively are approximately equal to 2.4, 2.0 and 1.45 for the emitted light having a wavelength of approximately 550 nm.

In order to investigate the effects of the refractive index of the core layer 2, two samples [5] and [4] using an SiON layer as the core layer 2 were also made, where the refractive indexes $n_{core}$ of the two samples are 1.5 and 1.7. The SiON layer is also formed by a plasma CVD using $SiH_4$, $N_2O$ and $NH_3$ gasses as source gasses. The SiON layer is formed under the same conditions used for forming the $Si_3N_4$ layer. The flow rates of the $SiH_4$, $N_2O$ and NH gasses respectively are 5 SCCM, 40 SCCM and 10 SCCM for obtaining the refractive index of 1.5, and are 5 SCCM, 20 SCCM and 30 SCCM for obtaining the refractive index of 1.7. The thickness of the SiON layer is 20 μm for each of the two samples [5] and [4].

In addition, in order to investigate the effects of the refractive index of the cladding layers 3 and 3a, a sample [6] using an SiON layer as the cladding layer 3 (and 3a), where the refractive index $n_{cl}$ of this sample [6] is 1.8. The SiON layer is also formed under approximately the same conditions used for forming the SiON layer described above, but the flow rates of the $SiH_4$, $N_2O$ and $NH_3$ gasses are respectively set to 5 SCCM, 10 SCCM and 40 SCCM. The thickness of the SiON layer is 3 μm.

Finally, a sample [7] having no optical waveguide was made for comparison purposes. In the sample [7], the lower electrode, the lower insulator layer, the light emitting layer, the upper insulator layer, the upper electrode and the interconnection for providing leads to the electrodes are successively formed on the substrate, but no optical waveguide is formed. Another sample [8] was made for comparison purposes, where an Al layer having a thickness of 1 μm is formed on the core layer as a metal reflection layer.

FIG. 9 shows the quantity of light emitted from the edge of each sample. The measurements were made by applying an A.C. voltage of 300 V having a frequency of 5 kHz across the electrodes of each sample (EL elements). Each sample has a size of 1 cm × 1 cm, and the quantity of light emitted from one edge was measured. The evaluation of each sample is made by assigning "A" for an output of 100 μW or greater, "B" for an output greater than 30 μW or less than 100 μm, and "C" for an output less than 30 μW.

It may be seen from the evaluation of FIG. 9 that the first through sixth embodiments can realize a light source which has a high luminance and a narrow light emitting width of several μm to several tens of μm, for example. In other words, the first through sixth embodiments are suited for use as a light source of an optical sensor, a light source of an optical printer and the like.

The first through sixth embodiments are characterized in that the refractive index of the optical waveguide increases from the outer side towards the center in cross section, and that the light emitting layer is located within the region of the optical waveguide. The refractive index of the optical waveguide may change continuously or change in steps. When changing the refractive index of the optical waveguide in steps, the layer located at the center of the optical waveguide is referred to as the core layer and the layer located on the outer side is referred to as the cladding layer. However, the surrounding air or a transparent substrate may be used as the cladding layer.

In order to increase the illumination efficiency, it is desirable to form a reflection layer on an edge of the optical waveguide opposite to the edge from which the light is emitted.

When using a plurality of light emitting parts which emit light having mutually different wavelengths, a plurality of light emitting layers are sequentially arranged within the optical waveguide as shown in FIG. 8, for example.

For example, ZnS, ZnSe, CaS, SrS and the like may be used for the light emitting layer 6, and Mn, TbF$_3$, TbOF, EuS, SmCl$_3$, TmF$_3$, Cu, CeCl$_3$ and the like may be used for the dopants thereof. In addition, Y$_2$O$_3$, Al$_2$O$_3$, SiO$_2$, Si$_3$N$_4$, AlN, Ta$_2$O$_3$, PbTiO$_3$ and the like may be used for the insulator layers 5 and 7. Al, Au, Ag, Cr and the like may be used for the electrodes 4 and 8. When making the electrodes 4 and 8 transparent with respect to the light emitted from the light emitting layer 6, SnO$_2$, In$_2$O$_3$, ZnO, CdO, Cd and the like may be used. The reflection layer 9 which has a high reflectivity may be made of a metal layer made of Ag, Au, Al, Cr and the like, or made of a dielectric multi-layer (stacked) structure.

An optical waveguide layer which is used for the cladding layers 3 and 3a and the core layers 2 and 2a may be made of MgO, SiO AlN, Al$_2$O$_3$, SiO$_2$, Si$_3$N$_4$, SiON and the like. SiON is particularly suited for use as the optical waveguide layer because it is easy to control the refractive index. The substrate 1 may be made of quartz glass, pyrex glass, crystal glass, soda glass, alumina, AlN, BN and the like.

When the substrate 1 is made of a material which is transparent with respect to the wavelength of the light emitted from the light emitting layer 6 and has a refractive index smaller than the refractive index of the core layer 2 or 2a, the substrate 1 itself may be used as the first cladding layer. In this case, the first cladding layer 3 shown in FIGS. 3 through 8 may be omitted. Similarly, when a space exists directly above the second cladding layer 3a, it is possible to use the space as the second cladding layer and the second cladding layer 3a may be omitted in this case.

The optical waveguides described heretofore are made up of a core layer and at least one cladding layer. However, the so-called graded-index type waveguide which is already realized in optical fibers and the like may be used as the optical waveguide. According to such a graded-index type waveguide, the refractive index of the optical waveguide continuously decreases from the center of the waveguide towards the outer side of the waveguide. In this case, the light emitting layer may be formed within the graded-index type waveguide. For example, the graded-index type waveguide may be formed by continuously changing the gas composition by a known means while forming the waveguide by ion exchange or CVD.

Figure 11:
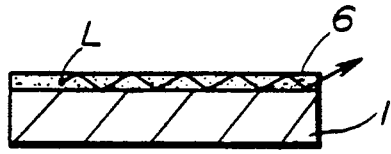
FIG. 11 is a cross sectional view showing an essential part of a conventional light emitting element for explaining a reflection of emitted light.
Figure 10:
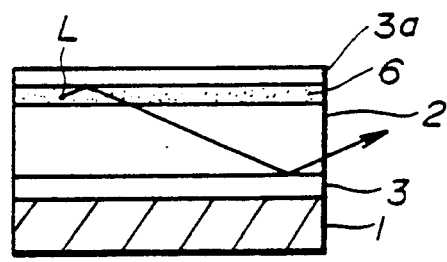
FIG. 10 is a cross sectional view showing an essential part of the light emitting element according to the present invention for explaining the reflection of emitted light.

The thickness of the core layers 2 and 2a is selected in a range of 2 to 1100 μm and desirably within a range of 10 to 50 μm. The thickness of the cladding layers 3 and 3a is selected to 0.3 μm or greater and desirably to 2 μm or greater. When the thickness of the core layer 2 is 1 μm or less, this thickness is not much different from the thickness of the light emitting layer 6 and the effect of using the waveguide shown in FIG. 10 cannot be expected. For comparison purposes, FIG. 11 shows a conventional EL element. In FIGS. 10 and 11, the same designations are used as in FIGS. 3 through 8, and L denotes the light which is emitted from the light emitting layer 6. On the other hand, when the thickness of the core layer is 100 μm or greater, the quantity of emitted light in total is large but the cross sectional area from which the light is emitted becomes too large and a high luminance cannot be expected.

When the thickness of the cladding layers 3 and 3a is set to 0.3 μm or less, the emitted light leaks to the outside via the cladding layers 3 and 3a and it no longer is possible to sufficiently trap the emitted light.

The ratio $n_{cl}/n_{EL}$ between the refractive index $n_{cl}$ of the cladding layers 3 and 3a and the refractive index $n_{EL}$ of the light emitting layer 6 is selected to 0.9 or less and desirably to 0.7 or less. This is because, as may be seen from the formula (1) described above, the quantity of light transmitted to the edge 10 decreases as the ratio $n_{cl}/n_{EL}$ approaches the value 1. In addition, the ratio $n_{core}/n_{EL}$ between the refractive index $n_{core}$ of the core layers 2 and 2a and the refractive index $n_{EL}$ of the light emitting layer 6 is selected to 0.5 or greater and desirably to 0.75 or greater. This is because the light emitted from the light emitting layer 6 undergoes a total reflection at the interface of the core layers 2 and 2a and the proportion of the light entering within the core layers 2 and 2a decreases when the ratio $n_{core}/n_{EL}$ is too small.

The formation of the core layers 2 and 2a is not limited to the thin film process. For example, a thin glass film may be adhered on the substrate 1 and used as the core layer.

Therefore, the first through sixth embodiments of the light emitting element according to the present invention forms the light emitting layer within the optical waveguide so that the light emitted from the light emitting layer reaches the edge of the core layer while repeating the total reflection. Hence, the smaller the attenuation of the light is when the light is transmitted from the light emitting layer to the edge of the core layer, the higher the luminance of the light emitted from the edge of the core is.

For example, when a metal layer is simply used to trap the light as proposed in the Japanese Laid-Open Patent Application No.57-7087, the quantity of the light emitted from the light emitting layer is reduced to 40% of the original quantity or less in approximately 20 reflections because the reflectivity of the metal layer is 95% at the maximum. Accordingly, even when the width of the light emitting layer is made large so as to increase the quantity of light emitted from the edge, the proportion of the light emitted from a location distant from the edge contributing to the increase in the quantity of light emitted from the edge is extremely small. In other words, the effect of making the width of the light emitting layer large is extremely small.

On the other hand, when the light is trapped by use of the optical waveguide which is made up of the core layer and the cladding layer, the quantity of the light emitted from the light emitting layer is only reduced to 90% of the original quantity even after approximately 100 reflections because the reflectivity of the light satisfying the conditions for total reflection is 99.9% or greater at the interface of the core layer and the cladding layer. Therefore, the luminance of the light emitted from the edge of the core layer can be increased proportionally to the increase in the length of the light emitting layer.

Next, a description will be given of the effects obtained by making the thickness of the core layer sufficiently large compared to the thicknesses of the light emitting layer and the insulator layers. As explained in Kun et al., "TFEL Edge Emitter Array for Optical Image Bar Applications", SID 86 DIGEST, pp. 270-272, in the case of the edge emitting type EL element having no waveguide structure, the proportion of the light emitted from the light emitting point reaching the light emitting edge sharply decreases when the distance between the light emitting point and the light emitting edge becomes several mm or greater. This is because the light repeats the reflection a large number of times before the light from the light emitting point reaches the light emitting edge due to the small thickness of the light emitting layer which is in the range of 5000 to 15000 Å. Hence, the attenuation of the quantity of light is large because of the large number of reflections, and a reabsorption of the emitted light takes place in the light emitting layer and the insulator layers, as may be seen from FIG. 11.

On the other hand, as may be seen from FIG. 10, the light emitted from the light emitting layer may be guided to the light emitting edge by use of the optical waveguide, and the use of the optical waveguide considerably reduces the number of reflections. Furthermore, the distance over which the light travels within the light emitting layer decreases considerably. For these reasons, the attenuation of the light is extremely small even when the distance between the light emitting point and the light emitting edge is relatively large.

Compared to the conventional edge emitting type EL element having no optical waveguide, the EL element according to the present invention can obtain a light emitting quantity which is approximately 10 or more times that obtainable from the conventional edge emitting type EL element. Thus, the EL element according to the present invention is suited for use on a facsimile machine and the like because of the high luminance and compact size.

Next, a description will be given of a first embodiment of an image sensor according to the present invention, by referring to FIG. 12.

Figure 12:
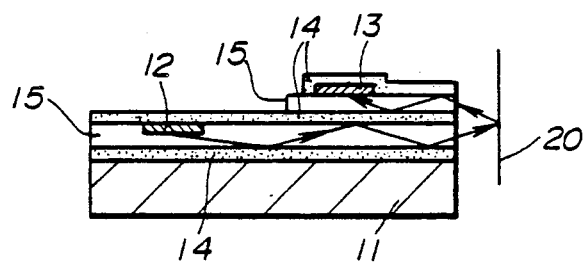
FIG. 12 is a cross sectional view showing an essential part of a first embodiment of an image sensor according to the present invention.

In FIG. 12, a waveguide of a light illuminating system is formed on a substrate 11, and a light emitting element 12 is formed within the waveguide. A waveguide of a light receiving system is formed on the waveguide of the light illuminating system, and a photoelectric conversion element 13 is formed within the waveguide of the light receiving system or facing the waveguide of the light receiving system.

The waveguide of the light illuminating system and the waveguide of the light receiving system are respectively made up of a core layer 15 and cladding layer 14. The light within the core layer 15 is trapped by the cladding layers 14 and propagates within the waveguide.

Because the light emitting element 12 is formed within the waveguide of the light illuminating system, a large part of the light emitted from the light emitting element 12 repeats total reflection at the interface of the core layer 15 and the cladding layer 14, and is finally emitted from the edge of the waveguide so as to illuminate a document 20. The light which is reflected by the document 20 enters the waveguide of the light receiving system and repeats total reflection until it reaches a light receiving part which includes the photoelectric conversion element 13. Hence, the reflected light is detected as a photocurrent in the light receiving part.

Figure 13:
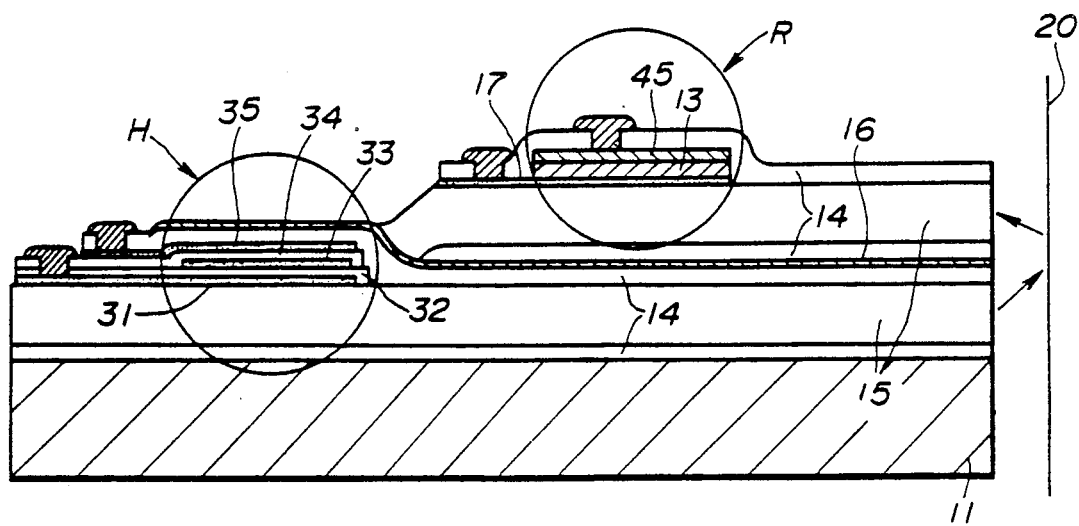
FIG. 13 is a cross sectional view showing an essential part of a second embodiment of the image sensor according to the present invention.

FIG. 13 shows an essential part of a second embodiment of the image sensor according to the present invention. In FIG. 13, those parts which are the same as those corresponding parts in FIG. 12 are designated by the same reference numerals, and a description thereof will be omitted.

In FIG. 13, a light emitting element part H includes a lower electrode 31, a lower insulator layer 32, a light emitting layer 33, an upper insulator layer 34 and an upper electrode 35 which are successively formed on the core layer 15. On the other hand, a light receiving element part R includes a transparent lower electrode 17, the photoelectric conversion element 13 and an upper electrode 45. A light blocking layer 16 is provided between the waveguide of the light receiving system and the waveguide of the light illuminating system. According to this embodiment, it is possible to prevent the undesirable effects of the stray light even when the light emitting element part H is provided adjacent to the light receiving element part R.

Figure 14:
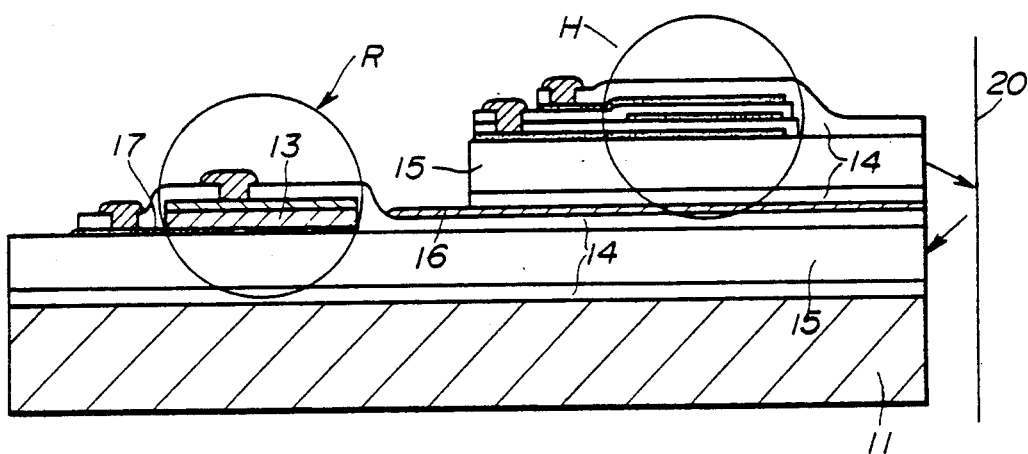
FIG. 14 is a cross sectional view showing an essential part of a third embodiment of the image sensor according to the present invention.

FIG. 14 shows an essential part of a third embodiment of the image sensor according to the present invention. In FIG. 14, those parts which are the same as those corresponding parts in FIGS. 12 and 13 are designated by the same reference numerals, and a description thereof will be omitted.

In FIG. 14, the light receiving system is formed first on the substrate 11, and the light illuminating system is formed thereafter. When forming the photoelectric conversion element 13 and a driving element therefor by a thin film process, the temperature becomes 500° C. or greater. Hence, this structure is more desirable in a case where the characteristic of the light emitting element part H is affected by the relatively high temperature.

On the other hand, when forming the light emitting element part H by the thin film process, the characteristic of the light receiving system R may be affected by the relatively high temperature of the thin film process. In this case, the structures shown in FIGS. 12 and 13 is more desirable.

Figure 15:
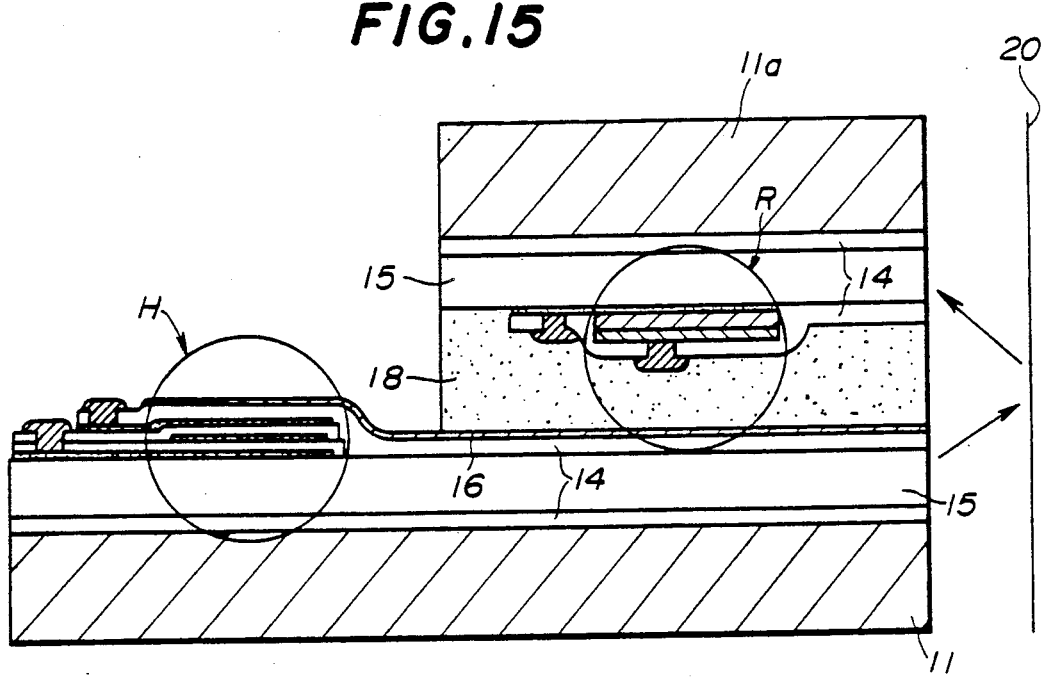
FIG. 15 is a cross sectional view showing an essential part of a fourth embodiment of the image sensor according to the present invention.

FIG. 15 shows an essential part of a fourth embodiment of the image sensor according to the present invention. In FIG. 15, those parts which are the same as those corresponding parts in FIGS. 12 through 14 are designated by the same reference numerals, and a description thereof will be omitted.

In FIG. 15, the light emitting element part H and the light receiving element part R are respectively formed on independent substrates 11 and 11a, and the two structures are thereafter bonded together. This arrangement is more desirable when the characteristic of the light emitting element part H is affected by the temperature of the thin film process which forms the light receiving element part R and the characteristic of the light receiving element part R is affected by the temperature of the thin film process which forms the light emitting element part H.

Figure 16:
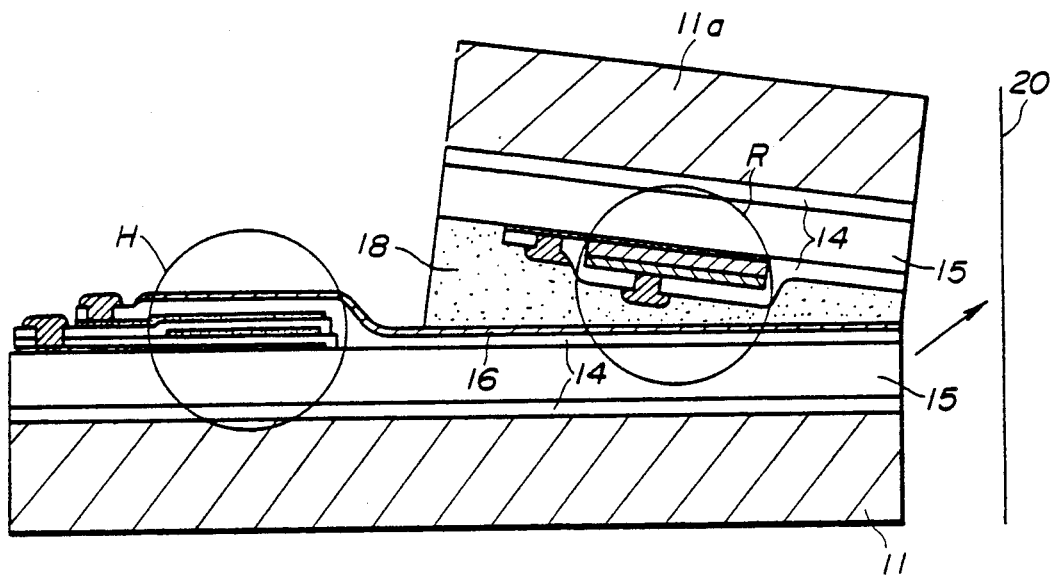
FIG. 16 is a cross sectional view showing an essential part of a fifth embodiment of the image sensor according to the present invention.

FIG. 16 shows an essential part of a fifth embodiment of the image sensor according to the present invention. In FIG. 16, those parts which are the same as those corresponding parts in FIGS. 12 through 15 are designated by the same reference numerals, and a description thereof will be omitted.

In FIG. 16, the two structures respectively having the light emitting element part H on the substrate 11 and the light receiving element part R on the substrate 11a are bonded together with a certain angle. According to this embodiment, it is possible to increase the quantity of light which is received by the light receiving system out of the light which is emitted from the light illuminating system for illuminating the document 20.

Figure 17:
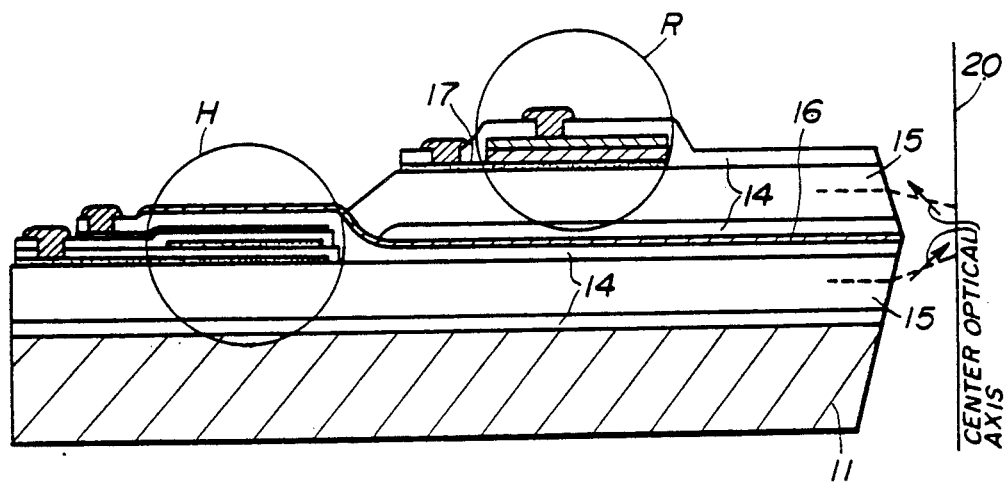
FIG. 17 is a cross sectional view showing an essential part of a sixth embodiment of the image sensor according to the present invention.

FIG. 17 shows an essential part of a sixth embodiment of the image sensor according to the present invention. In FIG. 17, those parts which are the same as those corresponding parts in FIGS. 12 through 16 are designated by the same reference numerals, and a description thereof will be omitted.

In FIG. 17, the edge of the waveguide of the light illuminating system and the edge of the waveguide of the light receiving system are oblique to the surface of the document 20. As a result, the center optical axis of the light illuminating system can be inclined with respect to the optical axis of the waveguide of the light illuminating system, and the center optical axis of the light receiving system can be inclined with respect to the optical axis of the waveguide of the light receiving system. As a result, it is possible to increase the quantity of light which is received by the light receiving system out of the light which is emitted from the light illuminating system. As a modification, only one of the edge of the waveguide of the light illuminating system and the edge of the waveguide of the light receiving system may be formed obliquely to the surface of the document 20.

In the first through sixth embodiments of the image sensor, the substrates 11 and 11a may be made of a material selected from a group including alumina, AlN, BN, quartz glass and pyrex glass. When the substrate material is transparent with respect to the wavelength of the light emitted from the light emitting element and has a refractive index lower than that of the core layer, it is possible to use the substrate itself as the cladding layer. Similarly, the surrounding space (air) or an adhesive layer may be used as the cladding layer.

The optical waveguides may be made of a material selected from a group including MgO, $SiO_2$, $Si_3N_4$, SiON and glass.

The optical waveguides of the first through sixth embodiments of the image sensor are made of a core layer and at least one cladding layer. However, the so-called graded-index type waveguide which is already realized in optical fibers and the like may be used as the optical waveguide. According to such a graded-index type waveguide, the refractive index of the optical waveguide continuously decreases from the center of the waveguide towards the outer side of the waveguide. In this case, the light emitting layer may be formed within the graded-index type waveguide. For example, the graded-index type waveguide may be formed by continuously changing the gas composition by a known means while forming the waveguide by ion exchange or CVD.

For example, the light emitting element may be made of an element selected from a group including EL element, LED and laser diode On the other hand, the photoelectric conversion element may be made of an element selected from a group including CdS element, amorphous silicon element, PIN photodiode, CCD and SIT.

The light blocking layer may be made of a material selected from a group including Al, Cr, MoSi and WSi.

Next, a description will be given of a method of producing the second embodiment of the image sensor shown in FIG. 13 for a case where the EL element is used as the light emitting element and the amorphous silicon element is used as the photoelectric conversion element. It is readily apparent to those skilled in the art that the first and third through sixth embodiments of the image sensor may be produced by similar processes, and a description thereof will be omitted.

In FIG. 13, an alumina substrate is used as the substrate 11. A $SiO_2$ layer having a refractive index of 1.45 is formed on the substrate 11 as the cladding layer 14 of the light illuminating system by a plasma CVD. The $SiO_2$ layer is formed to a thickness of 5 $\mu$m. Next, a SiN layer having a refractive index of 2.0 is formed as the core layer 15 by a plasma CVD. The SiN layer is formed to a thickness of 10 $\mu$m. Next, an ITO layer is formed as the lower electrode 31 of the EL element by an RF sputtering. The ITO layer is formed to a thickness of 1000 Å.

Then, a $Ta_2O_3$ layer is formed as the lower insulator layer 32 of the EL element by a reactive RF sputtering. The $Ta_2O_3$ is formed to a thickness of 3000 Å. A TbOF doped ZnS layer is formed as the light emitting layer 33 by an RF sputtering. The TbOF doped ZnS layer is formed to a thickness of 7000 Å. Next, the upper insulator layer 34 and the upper electrode 35 of the EL element are respectively formed similarly to the lower insulator layer 32 and the lower electrode 31 using the same materials and to the same thicknesses. A $SiO_2$ layer is formed to a thickness of 5 $\mu$m as the cladding layer 14 of the EL element.

A Cr layer is formed as the light blocking layer 16 by a vacuum vapor deposition. The Cr layer is formed to a thickness of 2000 A. Then, the cladding layer 14 and the core layer 15 are formed as the waveguide of the light receiving system, similarly to the waveguide of the light illuminating system. The cladding layer 14 is formed to a thickness of 5 $\mu$m, while the core layer 15 is formed to a thickness of 10 $\mu$m. An ITO layer is formed as the lower electrode 17 of the photoelectric conversion element by an RF sputtering. The ITO layer is formed to a thickness of 1000 Å. Next, an amorphous Si layer is formed as the photoelectric conversion element 13 by a plasma CVD. The amorphous Si layer is formed to a thickness of 1 $\mu$m.

A Cr layer is formed as the upper electrode 45 of the photoelectric conversion element 13 by a vacuum vapor deposition. The Cr layer is formed to a thickness of 2000 Å. Next, a $SiO_2$ layer is formed similarly as described above to a thickness of 5 $\mu$m as the cladding layer 14 of the light receiving system. Finally, an Al layer is formed to a thickness of 1 $\mu$m by a vacuum vapor deposition as the interconnections for the EL element and for the light receiving element.

The following effects are obtainable with the image sensor according to the present invention when compared to those proposed in the Japanese Laid-Open Patent Applications No.58-106947 and No.61-100073.

First, it is possible to reduce both the size and production cost of the image sensor because the light emitting element (light source) and the light receiving element can be formed successively on the same plane.

Second, the utilization efficiency of the light emitted from the light emitting element is high because the light emitting edge of the waveguide of the light illuminating system, the document surface and the light receiving edge of the waveguide of the light receiving system can be arranged closed to each other.

Third, since both the light illuminating system and the light receiving system use optical waveguides, the undesirable effects of the stray light is suppressed and it is possible to realize a high resolution.

Next, a description will be given of an operating principle of a light receiving element according to the present invention. According to the light receiving element of the present invention, one of the following three measures are taken.

According to a first measure, the light receiving element has an optical waveguide in the light receiving system, the edge of the optical waveguide confronts the surface of the document which is to be read, and at least two core layers are provided so that the refractive index of the optical waveguide is larger towards the center part thereof.

According to a second measure, the light receiving element has an optical waveguide in the light receiving system, the edge of the optical waveguide confronts the surface of the document which is to be read, and the edge of the optical waveguide is greatly inclined from the center part towards the outer side or the edge of the optical waveguide is inclined to the surface of the document which is to be read at a part away from the center part.

According to a third measure, the light receiving element has an optical waveguide in the light receiving system, the edge of the optical waveguide confronts the surface of the document which is to be read, and the edge of the optical waveguide has a lens function.

Prior to explaining embodiments of the light receiving element of the present invention, a description will be given of the positional relationship between the document and the edge of the optical waveguide, by referring to FIG. 18.

It is assumed for the sake of convenience that an edge (end surface) 49 of an optical waveguide confronts a document 50 with a predetermined distance D formed therebetween. The optical waveguide is made up of a core layer 51 and cladding layers (not shown). The light receiving element actually requires as image information the light reflected from a region L of the document 50. On the other hand, it is highly desirable from the point of view of not deteriorating the resolution that the light receiving element does not receive the light reflected from regions N1 and N2 of the document 50.

Figure 18:
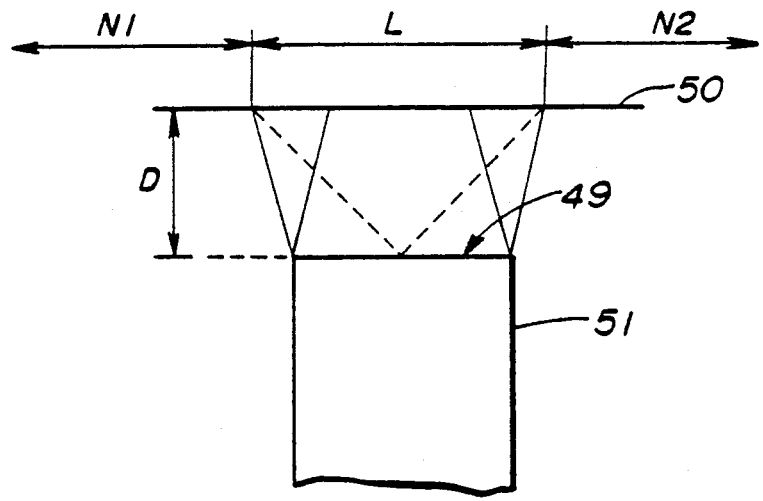
FIG. 18 is a diagram for explaining a positional relationship between a document and an edge of an optical waveguide.

In FIG. 18, a maximum reading angle for not deteriorating the resolution is as indicated by a phantom line at the center of the edge 49 and is as indicated by a solid line at the sides of the edge 49.

The reading angle for not deteriorating the resolution is increased with respect to the document 50 by making a ratio between the refractive index of the core layer 51 and the refractive index of the cladding layer small in a vicinity of the side of the edge 49 and large in a vicinity of the center of the edge 49. As a result, it is possible to receive a larger quantity of light with the same resolution when compared to a case where the ratio between the refractive indexes of the core and cladding layers is reduced for the entire optical waveguide.

Figure 19:
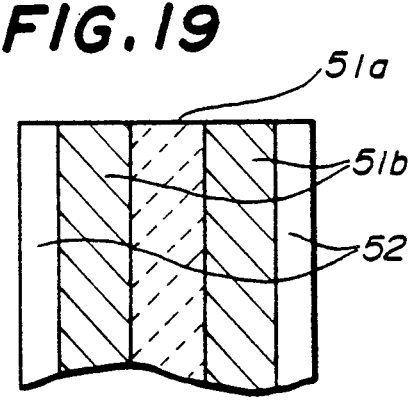
FIG. 19 is a cross sectional view showing an essential part of a first embodiment of a light receiving element according to the present invention.
Figure 20:
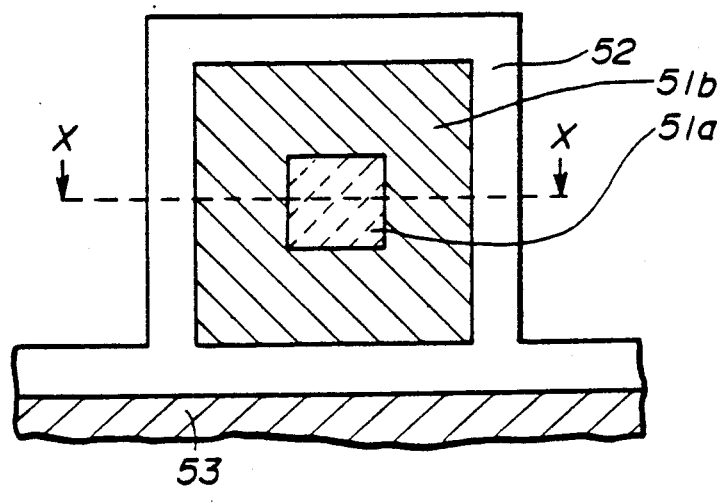
FIG. 20 is a front end view showing the essential part of the first embodiment of the light receiving element.

FIGS. 19 and 20 show an essential part of a first embodiment of the light receiving element according to the present invention. FIG. 20 shows a front end view of the light receiving element, and FIG. 19 shows a cross section taken along a line X—X in FIG. 20. An optical waveguide shown in FIGS. 19 and 20 includes a first core layer 51a, a second core layer 51b and a cladding layer 52. The cladding layer 52 is formed on a substrate 53. A relation $n_1 > n_2 > n_0$ stands, where $n_0$ denotes the refractive index of the cladding layer 52, $n_1$ denotes the refractive index of the first core layer 51a, and $n_2$ denotes the refractive index of the second core layer 51b.

In this embodiment, the core part is made up of the first and second core layers 51a and 51b. However, the core part may be made up of three or more core layers. In this case, the refractive indexes of the core layers are set to decrease from the center of the optical waveguide towards the cladding layer. For example, a first core layer may be located at the center of the optical waveguide so that a second core layer is formed on a periphery of the first core layer and a third core layer is formed on a periphery of the second core layer. In this case, it is possible to obtain effects which are essentially the same as those obtainable in the first embodiment of the light receiving element by satisfying a relation $n_1 > n_2 > n_3$, where $n_1$, $n_2$ and $n_3$ respectively denote the refractive indexes of the first, second and third core layers.

In the first embodiment of the light receiving element, the ratio $n_1/n_2$ between the refractive indexes $n_1$ and $n_2$ of the first and second core layers 51a and 51b is selected in a range of $1 < n_1/n_2 < 1.5$, and desirably in a range of $1 < n_1/n_2 < 1.2$.

When $n_1/n_2 \leq 1$, the reading angle for the first core layer 51a becomes smaller than that for the second core layer 51b and the effect of using a two-layer core part is small. Hence, the photocurrent does not increase in this case.

On the other hand, when $n_1/n_2 \geq 1.5$, $n_2/n_0 > 1.5$ because $n_2 > n_0$. A critical angle $\theta$ of the light which is incident to the first core layer 51a is described by $\theta = \sin^{-1}(n_1^2 - n_0^2)^{\frac{1}{2}}$. But since the refractive index $n_0$ of the cladding layer 52 is normally 1 or greater, the term $(n_1^2 - n_0^2)^{\frac{1}{2}}$ exceeds 1 and the critical angle $\theta$ no longer exists in this case. Thus, when $n_1/n_2 \leq 1.5$, the critical angle $\theta$ is 90° and constant, and only the surface reflection at the core layer increases even when the refractive index $n_1$ is increased thereby reducing the effects of the present invention.

The core layer may be formed to have the desired refractive index distribution using various techniques. A description will be given of embodiments of forming the core layer having the desired refractive index distribution.

According to the embodiment shown in FIGS. 21A through 21E, the core layer having the desired refractive index distribution is formed as follows. In FIG. 21A, the cladding layer 52, the second core layer 51b and the first core layer 51a are successively formed on the substrate 53. Then, the first core layer 51a is patterned, that is, etched to the second core layer 51b as shown in FIG. 21B. The second core layer 51b is formed again to completely cover the first core layer 51a as shown in FIG. 21C. The second core layer 51b is patterned and the second core layer 51b is etched to the cladding layer 52 as shown in FIG. 21D. The cladding layer 52 is formed to cover the second core layer 51b as shown in FIG. 21E.

According to the embodiment shown in FIGS. 22A through 22D, the core layer having the desired refractive index distribution is formed as follows. In FIG. 22A, the cladding layer 52, the second core layer 51b and the first core layer 51a are successively formed on the substrate 53. For example, the cladding layer is made of soda glass, the second core layer 51b is made of K+ ion glass, and the first core layer 51a is made of T1+ ion glass. Then, the first and second core layers 51a and 51b are patterned, that is, etched to the cladding layer 52 as shown in FIG. 22B. As shown in FIG. 22C, the refractive index at the peripheral part of the first core layer 51a is reduced and made the same as the refractive index of the second core layer 51b by an ion exchange. Finally, the refractive index at the surface portion of the second core layer 51b is reduced and made the same as the refractive index of the cladding layer 52.

According to the embodiment shown in FIGS. 23A through 23E, the core layer having the desired refractive index distribution is formed as follows. This embodiment combines the methods of the embodiments described above in conjunction with FIGS. 21A through 21E and FIGS. 22A through 22D.

In FIG. 23A, the cladding layer 52 and the second core layer 51b are successively formed on the substrate 53. Then, as shown in FIG. 23B, the first core layer 51a is formed by increasing the refractive index of one portion of the second core layer 51b by an ion exchange. The second core layer 51b is formed to completely cover the first core layer 51a as shown in FIG. 23C. The second core layer 51b is patterned by etching the second core layer 51b to the cladding layer 52 as shown in FIG. 23D. Finally, the cladding layer 52 is formed to cover the second core layer 51b as shown in FIG. 23E.

The method of changing the refractive index of a portion of the optical waveguide is not limited to the above, and other methods such as metal diffusion and laser annealing may be employed.

Next, a description will be given of a second embodiment of the light receiving element according to the present invention. In this embodiment, the optical waveguide is designed to improve the resolution of the light receiving element without the use of the core layer having the multi-layer structure and without affecting the stability of the resolution.

Figure 24:
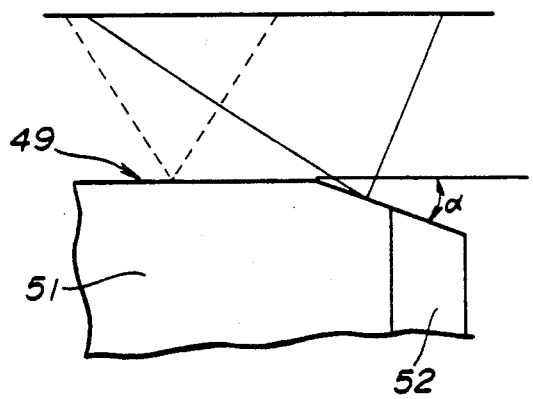
FIGS. 24, 25, 26 and 27 are cross sectional views respectively showing essential parts of second, third, fourth and fifth embodiments of the light receiving element according to the present invention.

According to this second embodiment of the light receiving element, at least a portion of the edge 49 of the optical waveguide is tapered with respect to the surface of the document 50 as shown in FIG. 24. The tapered edge part of the optical waveguide has a taper angle $\alpha$. The reading angle with respect to the document 50 at the non-tapered part of the edge 49 of the optical waveguide is as indicated by a phantom line which is symmetrical. But the reading angle at the tapered part of the edge 49 of the optical waveguide is as indicated by a solid line. At the tapered part, the reading angle to the right of the edge 49 is smaller than that of the reading angle at the non-tapered part, and the reading angle to the left of the edge 49 is larger than that of the reading angle at the non-tapered part.

Figure 25:
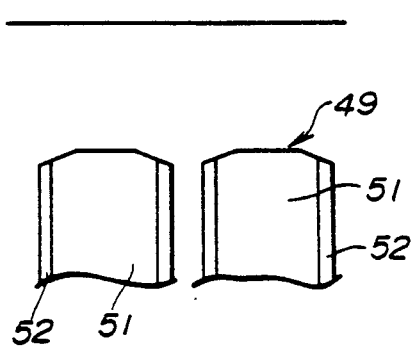

FIG. 25 shows an essential part of a third embodiment of the light receiving element. In this embodiment, both sides of the edge 49 of the optical waveguide are tapered with respect to the document 50 so that unwanted light from a region of the document 50 other than the region confronting the edge 49 of the optical waveguide will not enter the light receiving element.

Figure 26:
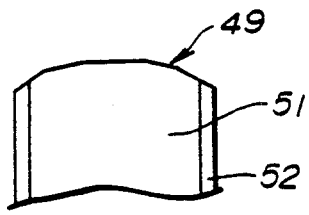

FIG. 26 shows an essential part of a fourth embodiment of the light receiving element. In this embodiment, the edge 49 of the optical waveguide includes more than two tapered parts. In other words, the edge 49 is a polygonal suface which approximates a curved surface having a predetermined curvature. The effect of preventing the unwanted light from entering the light receiving element is essentially the same as in the above described embodiments.

Figure 27:
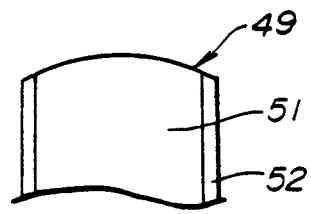

FIG. 27 shows an essential part of a fifth embodiment of the light receiving element. In this embodiment, the edge 49 of the optical waveguide has an inclination which changes continuously. In other words, the edge 49 is a curved surface having a predetermined curvature. Again, the effect of preventing the unwanted light from entering the light receiving element is essentially the same as in the above described embodiments.

Figure 28:
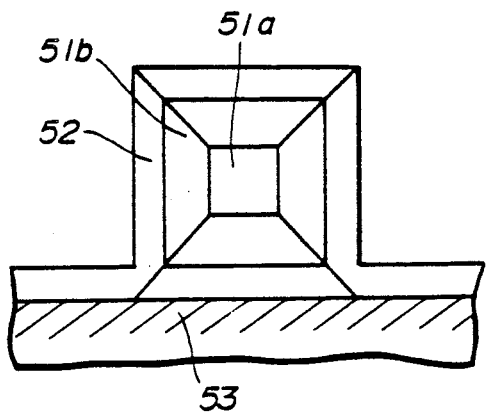
FIG. 28 is a front view showing an essential part of the third embodiment shown in FIG. 25 for explaining a taper angle.

Next, a description will be given of an optimum taper angle, by referring to the embodiment shown in FIG. 25. FIG. 28 shows a front view of the optical waveguide shown in FIG. 25. The taper angle $\alpha$ of the tapered part is selected in a range of $0° < \alpha < 80°$, and desirably in a range of $0° < \alpha < 60°$. When $\alpha \leq 0°$, the unwanted light from the region of the document 50 not confronting the edge 49 of the optical waveguide enters from the tapered side of the edge 49 of the optical waveguide. In this case, the resolution deteriorates and the above described effects cannot be obtained. On the other hand, when $\alpha \geq 80°$, the visual field towards the center of the optical waveguide is limited. In this case, the quantity of light received by the light receiving element decreases, and the above described effects cannot be obtained.

Figure 29:
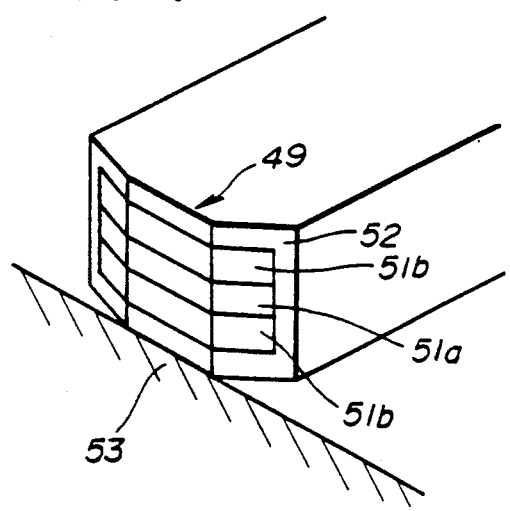
FIG. 29 is a perspective view showing an essential part of a sixth embodiment of the light receiving element according to the present invention.

FIG. 29 shows an essential part of a sixth embodiment of the light receiving element. In FIG. 29, those parts which are essentially the same as those corresponding parts in FIGS. 19 and 20 are designated by the same reference numerals, and a description thereof will be omitted. This embodiment combines the core layer which has the multi-layer structure and the desired refractive index distribution, and the tapered part of the edge 49 of the optical waveguide. In other words, the characteristic in a direction perpendicular to the substrate 53 is improved by changing the refractive index of the core layer so that the refractive index $n_1$ of the first core layer 51a is greater than the refractive index $n_2$ of the second core layer 51b. In addition, the characteristic in a direction parallel to the cross section of the substrate 53 is improved by providing tapered parts at the sides of the edge 49 of the optical waveguide.

Next, a description will be given of a seventh embodiment of the light receiving element according to the present invention. In this embodiment, the optical waveguide is designed to improve the resolution of the light receiving element without the use of the core layer having the multi-layer structure and without affecting the stability of the resolution.

Figure 30:
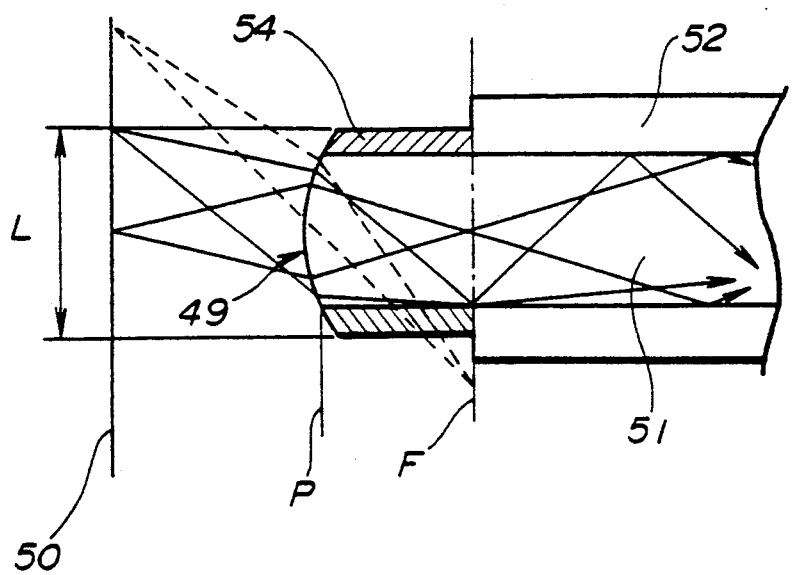
FIGS. 30 through 33 are cross sectional views respectively showing essential parts of seventh through tenth embodiments of the light receiving element according to the present invention.

FIG. 30 shows an essential part of the seventh embodiment of the light receiving element. In FIG. 30, those parts which are essentially the same as those corresponding parts in FIGS. 24 through 29 are designated by the same reference numerals, and a description thereof will be omitted. In this embodiment, the edge 49 of the optical waveguide is formed as a convex surface so that the light reflected from the document 50 is imaged on a focal surface F. The distance between the document 50 and the light receiving element and the focal distance of the optical waveguide are set so that the region L of the document 50 from which the light receiving element is to receive the reflected light is imaged on the focal surface F with a size identical to the cross section of the optical waveguide. By this setting, the light which is received from the region L of the document 50 will not be reflected by the side surface of the optical waveguide while the light reaches the focal surface F, as indicated by a solid line in FIG. 30. On the other hand, the light from regions of the document 50 other than the region L propagates along an optical path indicated by a phantom line so as to be imaged at the focal surface F. However, because the imaging position is located outside the core layer 51 of the optical waveguide, the light in most cases is reflected at the side surface of the optical waveguide before reaching the focal surface F. Hence, in order to improve the resolution, it is desirable that a light absorption layer 54 is provided on a part of the side surface of the core layer 51 closer to the document 50 and to the left of the focal surface F in FIG. 30, and the cladding layer 52 is provided on a part of the side surface of the core layer 51 closer to a photoelectric conversion part to the right of the focal surface F in FIG. 30. The light absorption layer 54 may be made of black dye, polymer layer, metal layer and the like.

In FIG. 30, P denotes a principal point. When the length of the light absorption layer 54 is denoted by A and the distance between the document 50, the edge 49 of the optical waveguide (principal point P) is denoted by B, and the refractive index of the core layer 51 is denoted by n, it is desirable that $0.3 \leq nA/B \leq 2$. This range is desirable for $nA/B$ for the following reasons. That is, when an area $S_1$ of the document 50 is to be read by the light receiving element and the core layer 51 has a cross sectional area $S_2$, the following relationship must stand in order to image the area $S_1$ of the document 50 so that the area $S_1$ is the same as the cross sectional area $S_2$ of the core layer 51.

$$S_2/S_1 = n^2 A^2/B^2$$

Accordingly, when $nA/B < 0.3$, the cross sectional area $S_2$ of the core layer 51 must be made 1/10 or less the area $S_1$ of the document 50 and a sufficiently large photocurrent cannot be obtained. On the other hand, when $nA/B > 2$, the area $S_1$ of the document 50 becomes ¼ or less the cross sectional area $S_2$ of the core layer 51 and a sufficiently large photocurrent cannot be obtained.

Figure 31:
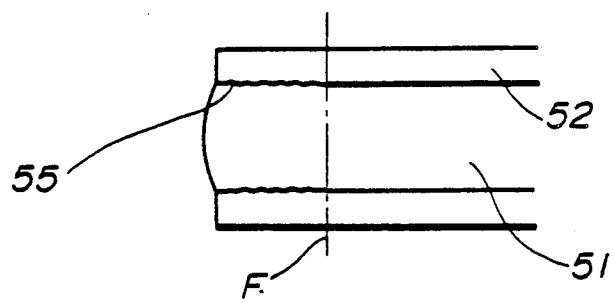

FIG. 31 shows an essential part of an eighth embodiment of the light receiving element. In FIG. 31, those parts which are essentially the same as those corresponding parts in FIG. 30 are designated by the same reference numerals, and a description thereof will be omitted. In this embodiment, a light scattering region 55 is provided in place of the light absorption layer 54. The light scattering region 55 includes fine concavo-convex patterns formed on the peripheral surface of the core layer 51.

Figure 32:
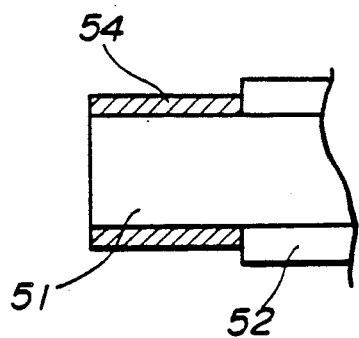

FIG. 32 shows an essential part of a ninth embodiment of the light receiving element. In FIG. 32, those parts which are essentially the same as those corresponding parts in FIG. 30 are designated by the same reference numerals, and a description thereof will be omitted. It may be seen from this embodiment that the light absorption layer 54 may be provided in any of the embodiments shown in FIGS. 19 through 29.

Figure 33:
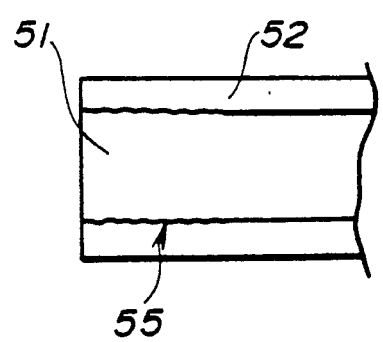

FIG. 33 shows an essential part of a tenth embodiment of the light receiving element. In FIG. 33, those parts which are essentially the same as those corresponding parts in FIG. 31 are designated by the same reference numerals, and a description thereof will be omitted. It may be seen from this embodiment that the light scattering region 55 may be provided in any of the embodiments shown in FIGS. 19 through 29.

For example, the core layer 51 (51a, 51b) of the optical waveguide may be made of a material selected from a group including quartz system glass, boracic system glass, chalcogen glass, lithium system oxide, ZnO and various polymers. In addition, the optical waveguide may be formed by techniques such as sputtering, plasma CVD, metal organic CVD (MOCVD), sol-gel technique, EB evaporation, ion exchange, and metal diffusion technique.

When forming the quartz system optical waveguide using the plasma CVD, the plasma may be formed by methods such as ECR plasma, RF plasma, thermionic plasma and cold cathode plasma. When carrying out the plasma CVD, the source gas for forming the quartz system optical waveguide may be selected from a group including silane, disilane, oxygen, nitrogen, carbon dioxide, methane, $N_2O$, tetraethoxy silane and ozone.

The substrate 53 may be made of a material selected from a group including boracic silicate glass, quartz glass, pyrex glass, alumina, aluminum nitride and boron nitride.

The light source for illuminating the document 50 may be selected from a group including fluorescent light, tungsten lamp, halogen lamp, LED, laser diode and EL lamp. In addition, in order to converge the light from the light source, it is possible to use in combination with the light source an element such as a cylindrical lens, micro lens array, fluorescent film, optical fiber array, thin glass plate and polymer films.

When the thickness of the core layer of the optical waveguide is smaller than the width of the cross section of the core layer in the light receiving element of the present invention, the resolution in most cases is primarily determined by the resolution in a main scanning direction, that is, in a direction which is perpendicular to the principal axis of the optical waveguide and parallel to the substrate surface. In such cases, the effects of the light receiving element according to the present invention can be obtained by taking the measures shown in FIGS. 19, 20, 25 and 30 through 33 at only the side of the optical waveguide.

In addition, the optical waveguide of the light receiving element may be formed by a process other than the thin film process. For example, the optical waveguide may be formed from glass optical fiber, plastic fiber, thin glass plate and the like.

The light receiving element of the present invention may also be applied to image guides using an optical fiber, such as an endoscope.

Next, a description will be given of samples produced in accordance with the first embodiment of the light receiving element shown in FIGS. 19 and 20.

Samples [11] through [16] were produced as follows. That is, a pyrex glass having a thickness of approximately 1 mm is used as the substrate 53 in FIG. 34. A Cr light blocking layer 57 is formed on the substrate 53 by a sputtering. This Cr light blocking layer 57 blocks the stray light from reaching the photoelectric conversion part via the substrate 53. The Cr light blocking layer 57 is formed to a thickness of approximately 1000 Å under sputtering conditions which are a substrate temperature of 80° C., an Ar gas pressure of 5 mTorr, and an RF power of 2 W/cm².

In addition, a chromium oxide layer 60 is formed on the Cr light blocking layer 57 by a sputtering at a substrate temperature of 80° C., an Ar partial gas pressure of 5 mTorr, an oxygen partial gas pressure of 2 mTorr and an RF power of 2 W/cm² so that the chromium oxide layer 60 is formed to a thickness of approximately 300 Å. The chromium oxide layer 60 is formed to reduce the reflectivity of the Cr light blocking layer 57 with respect to the light which is irradiated from the optical waveguide via the cladding layer 52. By the provision of the chromium oxide layer 60, it is possible to prevent the stray light from reaching the photoelectric conversion part.

Then, an RF plasma CVD is carried out to form a SiON layer of the optical waveguide. First, the cladding layer 52 is formed to a thickness of approximately 5 $\mu$m using silane, nitrogen and carbonic gasses having a flow rate ratio of 1:20:40. A substrate temperature of 200° C., an RF power of 100 mW/cm$^2$ and a gas pressure of 1 Torr are used. The refractive index $n_0$ of the cladding layer 52 is 1.46.

Second, the second core layer 51b is formed to a thickness of approximately 5 $\mu$m using the same gasses but having a flow rate ratio of 1:40:40. A substrate temperature of 200° C., an RF power of 100 mW/cm$^2$ and a gas pressure of 1 Torr are used. The refractive index $n_2$ of the second core layer 51b is 1.47.

Third, six kinds of first core layers 51a were formed to a thickness of approximately 10 $\mu$m under the same conditions except for the composition ratio of the gasses used. When the composition ratio of the silane, nitrogen and carbonic gasses is 1:X:40, the six samples [11] through [16] respectively correspond to cases where X=45, 50, 70, 80, 110 and 120. The refractive indexes $n_1$ of the first core layers 51a in the six samples respectively are 1.475, 1.50, 1.76, 1.8, 2.0 and 2.2.

An ITO layer is formed to a thickness of approximately 1800 Å as an electrode 58 of the photoelectric conversion part by a sputtering under a substrate temperature of 150° C., an Ar partial gas pressure of 2 mTorr, an oxygen partial gas pressure of 3 mTorr and an RF power of 1 W/cm$^2$. After patterning the ITO layer into a desired electrode shape, a SiON layer (not shown) is formed to a thickness of approximately 5000 Å as an interlayer insulator. This SiON layer is formed under the same conditions as the formation of the cladding layer 52. Next, a contact hole (not shown) is formed in a part of the interlayer insulator so as to enable a contact with the electrode 58, and an amorphous Si photoelectric conversion layer 56 is formed at the contact hole by an RF plasma CVD. The amorphous Si photoelectric conversion layer 56 is formed to a thickness of approximately 1 $\mu$m under a substrate temperature of 250° C., a pressure of 1 Torr, an RF power of 100 mW/cm$^2$. Silane and hydrogen gasses are used with a composition ratio of 1:4.

Figure 34:
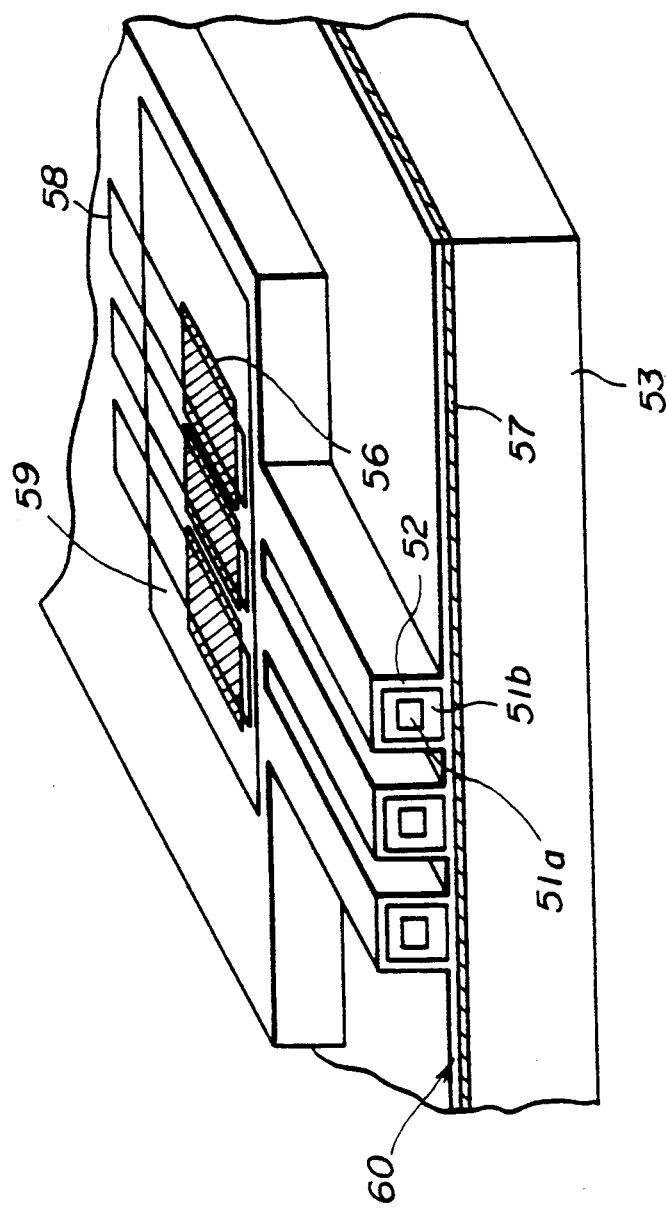
FIG. 34 is a perspective view showing a structure of a sample produced in accordance with the embodiment of the light receiving element.

After patterning the amorphous Si photoelectric conversion layer 56, an interlayer insulator (not shown) is formed and a contact hole (not shown) is formed in a part of this interlayer insulator under conditions similar to the above described so as to enable a contact with the amorphous Si photoelectric conversion layer 56. A Cr layer is formed on this interlayer insulator as an electrode 59 to a thickness of approximately 2000 Å under a substrate temperature of 80° C., an Ar gas pressure of 5 mTorr and an RF power of 2 W/cm$^2$. In order to improve the reliability of the interconnection, an Al layer having a thickness of approximately 1 $\mu$m is formed on the Cr layer by a vacuum thermal evaporation under a substrate temperature of 120° C. As shown in FIG. 34, the electrode 59 which is made up of the Cr and Al layers covers the entire surface of the amorphous Si photoelectric conversion part and also prevents the stray light above the light receiving element from reaching the photoelectric conversion part.

The first core layer 51a is etched to the interface of the second core layer 51b using an ECR etching using CHF$_3$ gas as an etching gas, a microwave power of 500 W, and a grid acceleration voltage of 500 V. Thereafter, the second core layer 51b is formed as described before in conjunction with FIGS. 21C and 21D, and the cladding layer 52 is then formed on the second core layer 51b. The second core layer 51b and the cladding layer 52 respectively have a thickness of 5 $\mu$m. The etching is carried out so that the first and second core layers 51a and 51b respectively have areas of 10 $\mu$m × 10 $\mu$m and 20 $\mu$m × 20 $\mu$m when viewed from the edge of the optical waveguide, and the edges of the optical waveguides are arranged with a pitch of 30 $\mu$m.

Finally, after cutting the edge of the optical waveguides using a dicing saw, a cerium pad is used to polish the edge (end surface) of the optical waveguide to a mirror surface.

For comparison purposes, a sample [17] having a core layer made up solely of the second core layer was produced. This sample [17] is basically the same as the sample [11] except for the core layer, the refractive index $n_2$ which is 1.47 and the area of the core layer which is 20 $\mu$m × 20 $\mu$m.

FIG. 35 shows the evaluation of the samples [11] through [17]. The evaluation was made as follows. That is, the document 50 used for the evaluation of the resolution of the light receiving element has a black-and-white stripe pattern having a line-and-space of approximately 30 $\mu$m intervals. The document 50 is illuminated using a tungsten line filament lamp as the light source and a cylindrical lens for converging the light from the light source on the document 50. For example, a lamp H-0885 manufactured by Hamamatsu Denkyu Kogyo of Japan may be used as the tungsten filament lamp, and a lens CL-1070-15PM manufactured by Sigma Koki of Japan may be used as the cylindrical lens. The distance between the document 50 and the light receiving element is approximately 30 $\mu$m. The resolution R is defined by $R=(I_W-I_B)/(I_W+I_B)$ by positioning the document 50 and the light receiving element so that the center between the white stripe pattern and the black stripe pattern matches the center of the edge (end surface) of the optical waveguide, where $I_W$ denotes a photocurrent flowing through the light receiving element when the white stripe confronts the edge of the optical waveguide and $I_B$ denotes a photocurrent flowing through the light receiving element when the black stripe confronts the edge of the optical waveguide. The closer the value of R is to 1, the higher the resolution is. In addition, the larger the value of $I_W$ is, the larger the light receiving quantity is.

In FIG. 35, the evaluation is "A" when $R \geq 0.85$ and $I_W \geq 0.5$ nA, and "B" when $R \geq 0.80$ and $I_W \geq 0.5$ nA. Otherwise, the evaluation is "C". It may be seen from FIG. 35 that satisfactory resolution and photocurrent are obtained when the core layer is made up of the first and second core layers and the refractive index of the first core layer is greater than the refractive index of the second core layer.

Next, a description will be given of samples produced in accordance with the third embodiment of the light receiving element shown in FIGS. 25 and 28.

Samples [21] through [26] were produced as follows. That is, the core layer 51 is formed from a single layer and not from first and second core layers as in the sample [11] described above. The single core layer is formed by a plasma CVD. The flow rate ratio of the silane, nitrogen and oxygen gasses is 1:50:40, and other conditions are the same as those when producing the sample [11]. The refractive index n of the single core layer is 1.50.

A tapered part shown in FIG. 28 is formed on the edge of the core layer 51 of the optical waveguide in a vicinity of the cladding layer 52 by an etching process. The etching conditions are the same as those used when etching the core layer of the sample [11]. Six samples [21] through [26] were formed respectively having taper angles of 5°, 20°, 60°, 65°, 75° and 85°. The part of the core layer 51 excluding the tapered part has an area of 10 μm×10 μm when viewed from the edge (end surface) of the optical waveguide.

The processes of producing the samples [21] through [26] are basically the same as those used to produce the samples [11] through [16] except for the process of forming the tapered part.

For comparison purposes, a sample [27] having no tapered part was also produced.

FIG. 36 shows the evaluation of the samples [21] through [27]. In FIG. 36, the same designations are used as in FIG. 35.

Next, a description will be given of samples produced in accordance with the seventh embodiment of the light receiving element shown in FIG. 30.

Samples [31] through [37] were produced as follows. That is, the core layer 51 is formed from a single layer and not from first and second core layers as in the sample [11] described above. The single core layer is formed by a plasma CVD. The refractive index n of the single core layer is 1.50. The core area, that is, the cross sectional area of the single core layer at the edge (end surface) of the optical waveguide, the focal distance f and the like of the samples [31] through [37] are as shown in FIG. 37.

The light absorption layer 54 shown in FIG. 30 is formed only to a length A on the side surface of the core layer 51. The light absorption layer 54 is made of carbon graphite and is formed to a thickness of approximately 1 μm by a sputtering under an Ar gas pressure of 5 mTorr, an RF power of 1 W/cm$^2$ and a substrate temperature of 250° C.

For comparison purposes, a sample [38] having no curve on the edge (end surface) of the optical waveguide is formed and also evaluated as shown in FIG. 37.

In FIG. 37, the same designations are used as in FIGS. 35 and 36. In addition, the "core area" refers to the cross sectional area of the core layer at the edge of the optical waveguide.

As may be seen from the evaluations shown in FIGS. 35 through 37, the resolution and photocurrent are improved by the light receiving element according to the present invention. Hence, the light receiving element according to the present invention is suited for use as an image input element of digital copying machines, facsimile machines and the like for reading fine drawings, graphics and photographs which require a high resolution Further, the present invention is not limited to these embodiments, but various variations and modifications may be made without departing from the scope of the present invention.

What is claimed is:

1. An optical device comprising:
    a substrate;
    a first optical waveguide provided on a surface of said substrate; and
    an electroluminescence element including a first electrode layer, a first insulator layer, a light emitting layer for emitting light, a second insulator layer and a second electrode layer which are successively stacked, said light emitted from said light emitting layer being emitted from a first end surface of said first optical waveguide,
    said first optical waveguide having a refractive index which increases from an outer periphery to a center portion of a cross section which is approximately parallel to said first end surface,
    said electroluminescence element being provided within said first optical waveguide.

2. The optical device as claimed in claim 1 wherein the refractive index of said first optical waveguide increases continuously from the outer periphery to the center portion of said cross section.

3. The optical device as claimed in claim 1 wherein the refractive index of said first optical waveguide increases in steps from the outer periphery to the center portion of said cross section.

4. The optical device as claimed in claim 1 wherein said electroluminescence element is positioned closer to one surface of said first optical waveguide in contact with the surface of said substrate.

5. The optical device as claimed in claim 1 wherein said electroluminescence element is positioned closer to one surface of said first optical waveguide opposite from another surface of said first optical waveguide in contact with the surface of said substrate.

6. The optical device as claimed in claim 1 wherein said first optical waveguide includes a core layer which is provided above said substrate.

7. The optical device as claimed in claim 1 wherein said first optical waveguide includes a core layer and a pair of cladding layers which sandwiches said core layer, one of said cladding layers being provided on the surface of said substrate.

8. The optical device as claimed in claim 1 wherein said first optical waveguide includes a core layer and at least one cladding layer provided on one surface of said core layer, one of said core layer and said cladding layer being provided on the surface of said substrate.

9. The optical device as claimed in claim 1 wherein said first optical waveguide includes first and second core layers which are successively provided above said substrate, said electroluminescence element being provided on said first core layer and being covered by said second core layer.

10. The optical device as claimed in claim 1 wherein said first optical waveguide includes first and second core layers which are stacked and a pair of cladding layers sandwiching said first and second core layers, said electroluminescence element being provided on said first core layer and being covered by said second core layer, one of said cladding layers being provided on the surface of said substrate.

11. The optical device as claimed in claim 1 wherein said first optical waveguide includes first and second core layers which are stacked and at least one cladding layer provided on one of said first and second core layers, said electroluminescence element being provided on said first core layer and being covered by said second core layer, one of said first core layer and said cladding layer being provided on the surface of said substrate.

12. The optical device as claimed in claim 1 which further comprises a reflection layer provided on at least one surface of said first optical waveguide.

13. The optical device as claimed in claim 1 which further comprises a reflection layer provided on at least a second end surface of said first optical waveguide opposite from the first end surface from which the light is emitted.

14. The optical device as claimed in claim 1 wherein said substrate itself has a reflecting surface on which said first optical waveguide is provided.

15. The optical device as claimed in claim 1 wherein said light emitting layer of said electroluminescence element is sectioned into a plurality of layer portions for emitting light of different colors, said layer portions being located on a single plane approximately parallel to the surface of said substrate.

16. The optical device as claimed in claim 1 wherein said first and second electrode layers of said electroluminescence element are transparent with respect to a wavelength of the light emitted from said light emitting layer.

17. The optical device as claimed in claim 1 wherein said first optical waveguide includes a core layer having a first refractive index, and said substrate is made of a material which is transparent with respect to a wavelength of the light emitted from the light emitting layer and has a second refractive index lower than the first refractive index so that said substrate itself functions as a cladding layer.

18. The optical device as claimed in claim 1 which further comprises a light blocking layer provided on said first optical waveguide, a second optical waveguide provided on said light blocking layer and a light receiving element for receiving the light which is emitted from said electroluminescence element via an object which is to be sensed and said second optical waveguide, said second optical waveguide having a second end surface from which the light is received from said object and a refractive index which increases from an outer periphery to a center portion of a cross section which is approximately parallel to said second end surface of said second optical waveguide, said second end surface of said second optical waveguide being adjacent to said first end surface of said first optical waveguide, said light receiving element being provided within said second optical waveguide.

19. The optical device as claimed in claim 18 wherein the refractive index of at least one of said first and second optical waveguides increases continuously from the outer periphery to the center portion of the respective cross section 20. The optical device as claimed in claim 18 wherein the refractive index of at least one of said first and second optical waveguides increases in steps from the outer periphery to the center portion of the respective cross section.

21. The optical device as claimed in claim 18 which further comprises another substrate on which said second optical waveguide is provided.

22. The optical device as claimed in claim 21 wherein said first and second optical waveguides are approximately parallel to each other.

23. The optical device as claimed in claim 18 wherein said first and second optical waveguides are approximately parallel to each other.

24. The optical device as claimed in claim 23 wherein at least one of said first and second end surfaces is inclined to a normal to the surface of said substrate.

25. The optical device as claimed in claim 23 wherein said first and second end surfaces are located on a single plane which is approximately perpendicular to the surface of said substrate 26. The optical device as claimed in claim 18 wherein said first and second optical waveguides are inclined with respect to each other 27. The optical device as claimed in claim 18 wherein at least one of said first and second optical waveguides includes a first core layer and a second core layer which surrounds said first core layer in the cross section of the optical waveguide, said first core layer having a refractive index greater than a refractive index of said second core layer.

28. The optical device a claimed in claim 27 wherein at least one of said first and second optical waveguides further includes a cladding layer which surrounds said second core layer, said cladding layer having a refractive index smaller than the refractive index of said second core layer.

29. The optical device as claimed in claim 28 wherein a ratio $n_1/n_2$ between the refractive index $n_1$ of said first core layer and the refractive index $n_2$ of said second core layer is selected in a range of $1 < n_1/n_2 < 1.5$.

30. The optical device as claimed in claim 18 wherein said second end surface includes a primary surface and at least one tapered surface which is located on both sides of said primary surface.

31. The optical device as claimed in claim 30 wherein said tapered surface forms a taper angle $\alpha$ with said primary surface, said taper angle being selected in a range of $0° < \alpha < 80°$.

32. The optical device as claimed in claim 30 wherein said primary surface and said at least one tapered surface on both sides of said primary surface form a polygonal surface which approximates a curved surface having a predetermined curvature so as to function as a lens.

33. The optical device as claimed in claim 30 wherein said second end surface includes a curved surface having a predetermined curvature so as to function as a lens.

34. The optical device as claimed in claim 18 wherein said second optical waveguide includes a core layer, a cladding layer which surrounds said core layer, and a light absorption layer which is formed on a periphery of said core layer in place of said cladding layer only in a vicinity of said second end surface.

35. The optical device as claimed in claim 34 wherein a relation $0.3 \geq nA/B \geq 2$ is satisfied, where n denotes a refractive index of said core layer, A denotes a length of said light absorption layer along a certain direction in which said second optical waveguide extends and B denotes a distance between said second end surface and the object along said certain direction.

36. The optical device as claimed in claim 18 wherein said second optical waveguide includes a core layer, a cladding layer which surrounds said core layer, and a light scattering region which is formed at an interface of said core layer and said cladding layer only in a vicinity of said second end surface.

37. The optical device as claimed in claim 36 wherein a relation $0.3 \leq nA/B \leq 2$ is satisfied, where n denotes a refractive index of said core layer, A denotes a length of said light scattering region along a certain direction in which said second optical waveguide extends and B denotes a distance between said second end surface and the object along said certain direction.

38. The optical device as claimed in claim 1 wherein said substrate is made of a material selected from a group including alumina, AlN, BN, quartz glass and pyrex glass.

39. The optical device as claimed in claim 1 wherein said first optical waveguide is made of a material selected from a group including MgO, SiO$_2$, Si$_3$N$_4$, SiON and glass.

40. An optical device comprising:
an optical waveguide having an end surface for receiving light; and
a light receiving element coupled to said optical waveguide for receiving the light from the end surface of said optical waveguide via said optical waveguide,
said optical waveguide having a refractive index which increases from an outer periphery to a center portion of a cross section which is approximately parallel to said end surface of said optical waveguide;
wherein the refractive index of said optical waveguide increases continuously from the outer periphery to the center portion of the cross section.

41. The optical device as claimed in claim 40 wherein the refractive index of said optical waveguide increases in steps from the outer periphery to the center portion of the cross section.

42. The optical device as claimed in claim 41 wherein said optical waveguide includes at least a first core layer and a second core layer which surrounds said first core layer in the cross section of said optical waveguide, said first core layer having a refractive index greater than a refractive index of said second core layer.

43. The optical device as claimed in claim 42 wherein said optical waveguide further includes a cladding layer which surrounds said second core layer, said cladding layer having a refractive index smaller than the refractive index of said second core layer.

44. The optical device as claimed in claim 43 wherein a ratio $n_1/n_2$ between the refractive index $n_1$ of said first core layer and the refractive index $n_2$ of said second core layer is selected in a range of $1 < n_1/n_2 < 1.5$.

45. The optical device as claimed in claim 40 wherein the end surface of said optical waveguide includes a primary surface and at least one tapered surface which is located on both sides of said primary surface.

46. The optical device as claimed in claim 45 wherein said tapered surface forms a taper angle $\alpha$ with said primary surface, said taper angle being selected in a range of $0° < \alpha < 80°$.

47. The optical device as claimed in claim 45 wherein said primary surface and said at least one tapered surface on both sides of said primary surface form a polygonal surface which approximates a curved surface having a predetermined curvature so as to function as a lens.

48. The optical device as claimed in claim 40 wherein the end surface of said optical waveguide includes a curved surface having a predetermined curvature so as to function as a lens.

49. The optical device as claimed in claim 40 wherein said optical waveguide includes a core layer, a cladding layer which surrounds said core layer, and a light absorption layer which is formed on a periphery of said core layer in place of said cladding layer only in a vicinity of said end surface 50. The optical device as claimed in claim 49 wherein a relation $0.3 \leq nA/B \leq 2$ is satisfied, where n denotes a refractive index of said core layer, A denotes a length of said light absorption layer along a certain direction in which said optical waveguide extends and B denotes a distance between said end surface and an object along said certain direction, said light received at said end surface being obtained from the object which is sensed thereby.

51. The optical device as claimed in claim 40 wherein said optical waveguide includes a core layer, a cladding layer which surrounds said core layer, and a light scattering region which is formed at an interface of said core layer and said cladding layer only in a vicinity of said end surface.

52. The optical device as claimed in claim 51 wherein a relation $0.3 \leq nA/B \leq 2$ is satisfied, where n denotes a refractive index of said core layer, A denotes a length of said light scattering region along a certain direction in which said optical waveguide extends and B denotes a distance between said end surface and an object along said certain direction, said light received at said end surface being obtained from the object which is sensed thereby.

53. The optical device as claimed in claim 1 wherein said optical waveguide is made of a material selected from a group including MgO, SiO$_2$, Si$_3$N$_4$, SiON and glass.

* * * * *